United States Patent
Iwabuchi

(10) Patent No.: US 10,614,134 B2
(45) Date of Patent: Apr. 7, 2020

(54) CHARACTERISTIC CONTENT DETERMINATION DEVICE, CHARACTERISTIC CONTENT DETERMINATION METHOD, AND RECORDING MEDIUM

(71) Applicant: Rakuten, Inc., Tokyo (JP)

(72) Inventor: Shigaku Iwabuchi, Shinagawa-ku (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 0 days.

(21) Appl. No.: 14/696,992

(22) Filed: Apr. 27, 2015

(65) Prior Publication Data
US 2015/0227627 A1 Aug. 13, 2015

Related U.S. Application Data

(63) Continuation-in-part of application No. 13/504,831, filed as application No. PCT/JP2010/068820 on Oct. 25, 2010, now abandoned.

(30) Foreign Application Priority Data

Oct. 30, 2009 (JP) .................................. 2009-250594
Oct. 30, 2009 (JP) .................................. 2009-250646

(51) Int. Cl.
G06F 16/951 (2019.01)
H04L 29/08 (2006.01)

(52) U.S. Cl.
CPC ............ *G06F 16/951* (2019.01); *H04L 67/02* (2013.01)

(58) Field of Classification Search
CPC ........... G06F 17/3053; G06F 17/30719; G06F 16/93; G06F 16/951; G06F 17/211; G06F 17/2705; H04L 67/02
See application file for complete search history.

(56) References Cited

U.S. PATENT DOCUMENTS 6,172,685 B1 * 1/2001 Pandit .................. G06F 16/345
345/471
6,665,668 B1 * 12/2003 Sugaya .................. G06F 16/93
707/730

(Continued)

FOREIGN PATENT DOCUMENTS

CN 101382962 A 3/2009
CN 101477563 A 7/2009

(Continued)

OTHER PUBLICATIONS

"Automatic banner creation" searched on Oct. 21, 2009, Internet <URL: http//hyperbannermaker.com/>, p. 1.

(Continued)

*Primary Examiner* — Wilson W Tsui
(74) *Attorney, Agent, or Firm* — Sughrue Mion, PLLC

(57) ABSTRACT

A characteristic content determination device extracts a content constituting a designated Web page. The characteristic content determination device calculates a first frequency of appearance of each content constituting the designated Web page in the designated Web page. The characteristic content determination device calculates a second frequency of appearance of each content constituting the designated Web page in other Web pages. Then, the characteristic content determination device determines a characteristic content of the designated Web page among contents constituting the designated Web page based on the calculated first frequency of appearance and the calculated second frequency of appearance.

11 Claims, 21 Drawing Sheets

(56) References Cited

U.S. PATENT DOCUMENTS

| | | |
|---|---|---|
| 7,240,056 B2 | 7/2007 | Ponte |
| 7,296,222 B1 | 11/2007 | Sakairi |
| 7,725,502 B1 | 5/2010 | Badros et al. |
| 7,769,749 B2 | 8/2010 | He |
| 7,783,967 B1* | 8/2010 | Carnell .................. G06F 16/958 715/234 |
| 8,051,372 B1* | 11/2011 | Sandhaus ............... G06F 16/81 715/234 |
| 8,145,526 B2 | 3/2012 | Redlich |
| 8,200,670 B1* | 6/2012 | Flaster .................. G06F 16/355 707/737 |
| 8,200,672 B2 | 6/2012 | Adachi et al. |
| 8,239,754 B1 | 8/2012 | Orthlieb |
| 8,244,795 B2 | 8/2012 | Ponte |
| 8,301,450 B2 | 10/2012 | Lee et al. |
| 8,375,073 B1* | 2/2013 | Jain ....................... G06F 16/951 707/899 |
| 8,719,308 B2 | 5/2014 | Xiong et al. |
| 2002/0010622 A1* | 1/2002 | Okamoto ........... G06Q 10/0637 705/7.33 |
| 2003/0028559 A1 | 2/2003 | Moreau |
| 2003/0229854 A1* | 12/2003 | Lemay .................. G06F 16/345 715/227 |
| 2004/0117363 A1* | 6/2004 | Ohno ..................... G06F 16/951 |
| 2005/0091106 A1 | 4/2005 | Reller et al. |
| 2005/0194880 A1* | 9/2005 | Moon .................... H01J 31/127 313/311 |
| 2005/0228800 A1* | 10/2005 | Dettinger ................ G06F 16/86 |
| 2005/0234953 A1* | 10/2005 | Zhang ................ G06F 17/30663 |
| 2005/0267915 A1 | 12/2005 | Zhulong et al. |
| 2006/0015401 A1 | 1/2006 | Chu et al. |
| 2006/0218106 A1* | 9/2006 | Pope ..................... G06F 16/951 706/12 |
| 2006/0288084 A1* | 12/2006 | Nguyen ............ G06F 17/30905 709/217 |
| 2007/0027772 A1* | 2/2007 | Chou ..................... G06Q 30/02 705/14.54 |
| 2007/0061243 A1* | 3/2007 | Ramer ............... G06F 17/30905 705/37 |
| 2007/0100803 A1* | 5/2007 | Cava .................... G06F 17/3064 |
| 2009/0067395 A1 | 3/2009 | Curtis et al. |
| 2009/0125503 A1* | 5/2009 | He ...................... G06F 17/3071 |
| 2009/0193075 A1* | 7/2009 | Persinger ................ G06F 21/62 709/203 |
| 2009/0259673 A1* | 10/2009 | Choi ..................... G06Q 10/107 |
| 2009/0271438 A1* | 10/2009 | Agapi ................... G06Q 10/109 |
| 2009/0313127 A1 | 12/2009 | Chaiken et al. |
| 2009/0313579 A1 | 12/2009 | Poulson |
| 2010/0058204 A1* | 3/2010 | Wilson ................ G06F 16/9535 715/760 |
| 2010/0058440 A1 | 3/2010 | Yiu et al. |
| 2010/0094799 A1 | 4/2010 | Ohashi et al. |
| 2010/0106595 A1 | 4/2010 | Baugher |
| 2010/0121711 A1 | 5/2010 | Park |
| 2010/0131187 A1 | 5/2010 | Lai et al. |
| 2010/0185664 A1 | 7/2010 | Baggott et al. |
| 2010/0192055 A1* | 7/2010 | Shaked ............. G06F 17/30864 715/234 |
| 2010/0287162 A1* | 11/2010 | Shirwadkar ......... G06F 17/2785 707/740 |
| 2011/0022465 A1* | 1/2011 | Malleshaiah .......... G06Q 30/02 705/14.54 |
| 2011/0029384 A1* | 2/2011 | Wei ....................... G06F 3/0481 705/14.53 |
| 2011/0225115 A1* | 9/2011 | Moitra ................ G06H 3/04817 706/50 |
| 2011/0264649 A1* | 10/2011 | Hsiao ..................... G06N 5/022 707/722 |
| 2012/0226685 A1 | 9/2012 | Agapiev |
| 2013/0041898 A1 | 2/2013 | Ishida |
| 2013/0117268 A1 | 5/2013 | Smith et al. |
| 2013/0232170 A1 | 9/2013 | Hirate |
| 2013/0246436 A1 | 9/2013 | Levine |
| 2014/0006922 A1 | 1/2014 | Smith et al. |

FOREIGN PATENT DOCUMENTS

| | | |
|---|---|---|
| JP | 2000-207414 A | 7/2000 |
| JP | 2001282837 A | 10/2001 |
| JP | 2003141134 A | 5/2003 |
| JP | 2003-223449 A | 8/2003 |
| JP | 2003-308461 A | 10/2003 |
| JP | 2004-178263 A | 6/2004 |
| JP | 2005122690 A | 5/2005 |
| JP | 2005236646 A | 9/2005 |
| JP | 2005302041 A | 10/2005 |
| JP | 2006-146506 A | 6/2006 |
| JP | 2006-259965 A | 9/2006 |
| JP | 2006338086 A | 12/2006 |
| JP | 2007-080061 A | 3/2007 |
| JP | 2008130032 A | 6/2008 |
| JP | 2008139928 A | 6/2008 |
| JP | 2008226235 A | 9/2008 |
| JP | 2009053983 A | 3/2009 |
| JP | 2009-199513 A | 9/2009 |
| JP | 2009-205499 A | 9/2009 |
| JP | 2010-533897 A | 10/2010 |
| KR | 10-2007-0047579 A | 5/2007 |
| WO | 03/046764 A1 | 6/2003 |
| WO | 2008/108515 A1 | 9/2008 |

OTHER PUBLICATIONS

Japanese Patent Office Action dated Apr. 17, 2012 for Japanese Patent Application No. 2009-250646.

Japanese Patent Office Action dated Apr. 17, 2012 for Japanese Patent Application No. 2009-250594.

Lin, et al., Discovering Informative Content Blocks from Web Documents, ACM 2002, pp. 588-593.

Spiliopoulou, Web Usage Mining for Web Site Evaluation, ACM 2000, pp. 127-134.

Cruz et al., Measuring Structural Similarity among Web Documents: Preliminary Results, Google 1998, pp. 513-524.

* cited by examiner

CHARACTERISTIC CONTENT DETERMINATION DEVICE, CHARACTERISTIC CONTENT DETERMINATION METHOD, AND RECORDING MEDIUM

This is a Continuation-in-Part of application Ser. No. 13/504,831, filed Apr. 27, 2012, which is a National Stage of International Application No. PCT/JP2010/068820, filed Oct. 25, 2010, claiming priority based on Japanese Patent Application Nos. 2009-250594 and 2009-250646, filed Oct. 30, 2009, the contents of which are incorporated herein by reference in their entireties.

TECHNICAL FIELD

The present invention relates to a technical field of extracting contents constituting a Web page.

BACKGROUND ART

There is conventionally known a technique for acquiring a content material constituting a Web page disclosed on a Web site and generating a new content based on the acquired content. For example, Non-Patent Literature 1 discloses therein a technique in which when a user designates a URL of image data, the image data corresponding to the URL is obtained from a Web and a banner is automatically created based on the acquired image data.

PRIOR ART DOCUMENTS

Non-Patent Document

Non-Patent Literature 1: "Automatic banner creation" [online], [searched on Oct. 21, 2009], Internet <URL: http//hyperbannermaker.com/>

SUMMARY OF THE INVENTION

Problems to be Solved by the Invention

Contents according to the purpose of a Web site are posted on each Web page constituting the Web site. Thus, the contents in each Web page constituting the Web site basically have a mutual relationship, but may have some characteristics, respectively. Then, a cause for determining a content of the Web page is a content constituting the Web page (such as text data or image data). Thus, a content featuring the Web page, that is, a characteristic content of the Web page may be present among the contents constituting the Web page.

The technique described in Non-Patent Literature 1 is directed for extracting a characteristic content of the Web page, not automatically extracting the same, where a user has to manually designate a content and the characteristic content of the Web page cannot be easily extracted. Thus, when the user cannot determine which content is characteristic of the Web page or when favorite contents depend on user's preference, a characteristic content of the Web page cannot be accurately extracted. There is a problem that when many target Web pages are present, an enormous amount of user's work is needed.

Only specific types of contents can be extracted, such as only images or texts, based on the description of tags of HTML (HyperText Markup Language) documents, for example. However, since an ordinary content, not characteristic of the Web page, is contained in the extracted contents, an extraction result has a low reliability and thus the user has to search a characteristic content from the extraction result.

The present invention has been made in terms of the above problems, and it is an object thereof to provide a characteristic content determination device and a characteristic content determination method capable of easily extracting a characteristic content of a Web page from the contents constituting the Web page.

Means for Solving the Problems

A first aspect of the present invention is a characteristic content determination device comprising: an extraction unit that extracts a content constituting a designated Web page; a first calculation unit that calculates a first frequency of appearance of each content constituting the designated Web page in the designated Web page; a second calculation unit that calculates a second frequency of appearance of each content constituting the designated Web page in other Web pages; and a determination unit that determines a characteristic content of the designated Web page among contents constituting the designated Web page based on the calculated first frequency of appearance and the calculated second frequency of appearance.

According to the aspect, the first frequency of appearance of each content constituting the designated Web page in the designated Web page is calculated, respectively. The second frequency of appearance of each content constituting the designated Web page in other Web pages is calculated, respectively. A characteristic content of the designated Web page can be specified based on the calculated first frequency of appearance and the second frequency of appearance.

A second aspect of the present invention is the characteristic content determination device, further comprising an identification unit that identifies Web pages each including a content which is same as that included in the designated Web page, wherein the second calculation unit calculates the second frequency of appearance of each content constituting the designated Web page in the identified Web pages.

A third aspect of the present invention is the characteristic content determination device, wherein the determination unit determines that a content with the highest ratio of the first frequency of appearance to the second frequency of appearance among the contents constituting the designated Web page is a characteristic content of the designated Web page.

According to the aspect, when a content with the highest ratio of the first frequency of appearance to the second frequency of appearance is determined, a characteristic content of the designated Web page is specified.

A forth aspect of the present invention is the characteristic content determination device, wherein the determination unit determines that a content with a ratio, having a predetermined value or more, of the first frequency of appearance to the second frequency of appearance among the contents constituting the designated Web page is a characteristic content of the designated Web page.

According to the aspect, when a determination is made as to whether the ratio of the first frequency of appearance to the second frequency of appearance is the predetermined value or more, all the contents meeting the condition can be specified as the characteristic contents of the designated Web page.

A fifth aspect of the present invention is the characteristic content determination device, wherein the second calculation unit calculates the second frequency of appearance of each content in multiple Web pages contained in a predetermined site.

According to the aspect, since the frequency of appearance of each content constituting the designated Web page is calculated on multiple Web pages contained in the predetermined site, it can be determined that the content commonly used within the site is not characteristic of the Web page, thereby enhancing an accuracy of determining a characteristic content of the Web page.

A sixth aspect of the present invention is the characteristic content determination device, wherein the extraction unit extracts a content constituting a Web page for each predetermined type of Web page contained in a predetermined site and stores content information indicating the extracted content in a storage unit, the first calculation unit calculates the first frequency of appearance based on the stored content information, and the second calculation unit calculates the second frequency of appearance based on the stored content information.

According to the aspect, since the frequency of appearance of each content constituting the designated Web page is calculated based on the content information as the result previously extracted for each predetermined type of Web page contained in the predetermined site, the frequency of appearance can be accurately calculated, thereby enhancing an accuracy of determining a characteristic content of the Web page.

A seventh aspect of the present invention is the characteristic content determination device, wherein the extraction unit extracts a content constituting the designated Web page in units of content group comprising one or more contents, the first calculation unit calculates the first frequency of appearance of a content group constituting the designated Web page, the second calculation unit calculates the second frequency of appearance of a content group constituting the designated Web page, and the determination unit determines a characteristic content group of the Web page among content groups constituting the designated Web page.

According to the aspect, since a characteristic content of the Web page is determined in units of content group, for example, when contents are displayed in a certain group on the Web page or when contents having a mutual relationship are grouped, a characteristic content of the Web page can be extracted.

An eighth aspect of the present invention is the characteristic content determination device, wherein the extraction unit extracts a content group based on document data indicating a content described in a predetermined markup language and constituting the designated Web page.

According to the aspect, since a content group is extracted based on document data indicating contents constituting a Web page, the content group can be accurately extracted.

A ninth aspect of the present invention is the characteristic content determination device, wherein the extraction unit defines a content group based on a predetermined tag in the document data indicating the content.

According to the aspect, since a content group is extracted based on the predetermined tags, when the characteristic contents of the Web page and the non-characteristic contents are grouped based on the predetermined tags, respectively, an accuracy of determining a characteristic content of the Web page can be enhanced.

A tenth aspect of the present invention is a characteristic content determination method comprising: an extraction step of extracting a content constituting a designated Web page; a first calculation step of calculating a first frequency of appearance of each content constituting the designated Web page in the designated Web page; a second calculation step of calculating a second frequency of appearance of each content constituting the designated Web page in other Web pages; and a determination step of determining a characteristic content of the designated Web page among contents constituting the designated Web page based on the calculated first frequency of appearance and the calculated second frequency of appearance.

According to the aspect, since a new content can be generated based on a characteristic content of a Web page, a content indicating the characteristic contents posted on the Web page can be generated.

An eleventh aspect of the present invention is a recording medium computer-readably recording a characteristic content determination program therein, the program causing a computer to function as: an extraction unit that extracts a content constituting a designated Web page; a first calculation unit that calculates a first frequency of appearance of each content constituting the designated Web page in the designated Web page; a second calculation unit that calculates a second frequency of appearance of each content constituting the designated Web page in other Web pages; and a determination unit that determines a characteristic content of the designated Web page among contents constituting the designated Web page based on the calculated first frequency of appearance and the calculated second frequency of appearance.

A twelfth aspect of the present invention is the characteristic content determination device, further comprising a generation unit that generates a new content based on a content determined as characteristic by the determination unit.

A thirteenth aspect of the present invention is the characteristic content determination device, wherein the generation unit adjusts a display size of a content determined as characteristic to be suitable for a preset display size, and generates a new content containing the content with the adjusted display size.

According to the aspect, since a content related to the content determined as characteristic is inserted into the designated Web page, the information related to the characteristics of the Web page can be added to the Web page.

Effects of the Invention

According to the present invention, a characteristic content of the designated Web page can be specified based on the frequency of appearance. Thereby, a characteristic content of the Web page can be easily extracted.

BEST MODES FOR CARRYING OUT THE INVENTION

1. First Embodiment

A first embodiment according to the present invention will be described below with reference to the drawings. The embodiment described later is when the present invention is applied to a server device for generating a new content based on a characteristic content of a Web page extracted from the Web page in a shopping site in a shopping system in which products are sold and bought by electronic exchanges over a network.

[1-1. Outline of Structure and Functions of Shopping System]

The structure and schematic functions of a shopping system S according to the present embodiment will be described first with reference to FIG. 1.

Figure 1:
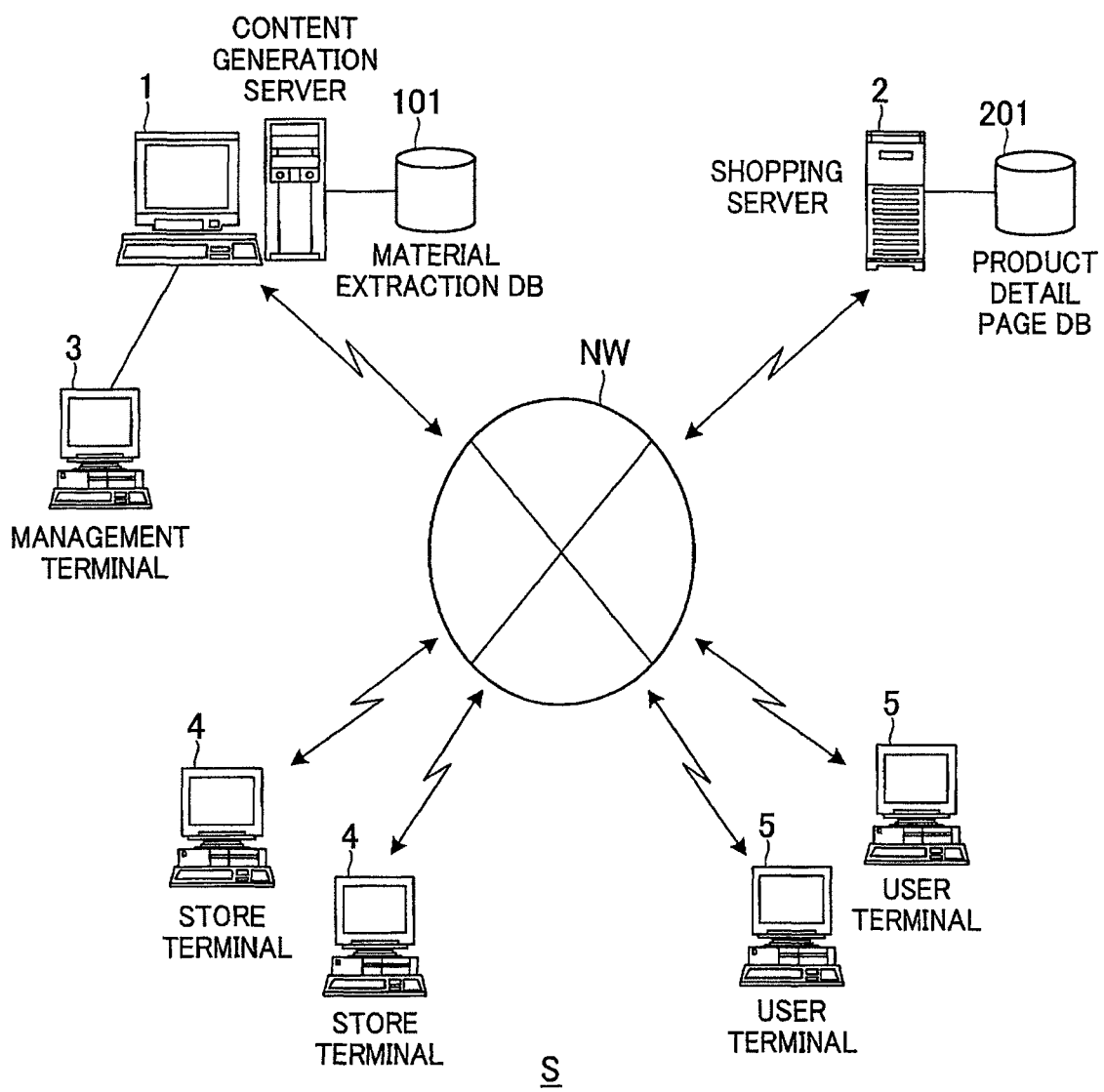
FIG. 1 is a diagram showing an exemplary schematic structure of a shopping system S according to one embodiment.

FIG. 1 is a diagram showing an exemplary schematic structure of the shopping system S according to the present embodiment.

As shown in FIG. 1, the shopping system S includes a content generation server 1 as exemplary characteristic content determination device and content generation device, a shopping server 2, a management terminal 3, multiple store terminals 4, and multiple user terminals 5. The content generation server 1, the shopping server 2, each store terminal 4 and each user terminal 5 can mutually exchange data by use of a communication protocol such as TCP/IP via a network NW. The network NW is configured of Internet, a dedicated communication line (such as CATV (Community Antenna Television) line), a mobile communication network (including base stations and the like) or a gateway, for example. The content generation server 1 and the management terminal 3 are connected to each other via a network such as LAN (Local Area Network). The content generation server 1 and the shopping server 2 may similarly be connected to each other via a network such as LAN.

In the thus-configured shopping system S, the shopping server 2 is a Web server for transmitting a Web page constituting a shopping site in response to a request from the store terminal 4 or the user terminal 5. The shopping server 2 registers products to be sold on the shopping site and generates product detail pages describing detailed explanations of the products and the like thereon, based on a request from the store terminal 4. Then, the shopping server 2 comprises a product detail page DB 201, and registers generated product detail pages (HTML documents of the product detail pages (exemplary document data), image data as materials of the product detail pages, and the like) in the product detail page DB 201. The shopping server 2 performs a product purchase processing based on a request from the user terminal 5 of a user who browsed the product detail page.

The store terminal 4 is a terminal device used by an employee of the store selling products on the shopping site. The store terminal 4 employs a personal computer, for example.

The user terminal 5 is a terminal device used by a user who purchases products on the shopping site. The user terminal 5 employs a personal computer, a PDA, or a cell phone, for example.

The content generation server 1 generates a Flash content (software standardized by Adobe Systems) indicating the characteristics of a designated product detail page (and further indicating the characteristics of the product) based on a request from the management terminal 3 or the store terminal 4. The Flash content to be generated is a product banner image, a slide show content introducing a product, or an animation content, for example. The Flash content may be posted on a Web site managed by the store or may be used as a material of a Web page constituting the shopping site, for example.

In order to generate such a Flash content, the content generation server 1 comprises a material extraction DB 101, extracts a content (such as image data, and text data described in HTML document) as a Web material constituting the product detail page registered in the product detail page DB 201 and registers the extraction result in the material extraction DB 101. Then, the content generation server 1 specifies a characteristic content of the product detail page among the contents extracted from the designated product detail page, and generates a Flash content based on the specified content.

The management terminal 3 is a terminal device used by a system manager of the shopping system S. The management terminal 3 employs a personal computer, for example.

[1-2. Structure and Functions of Content Generation Server]

The structure and functions of the content generation server 1 will be described below with reference to FIG. 2.

Figure 2:
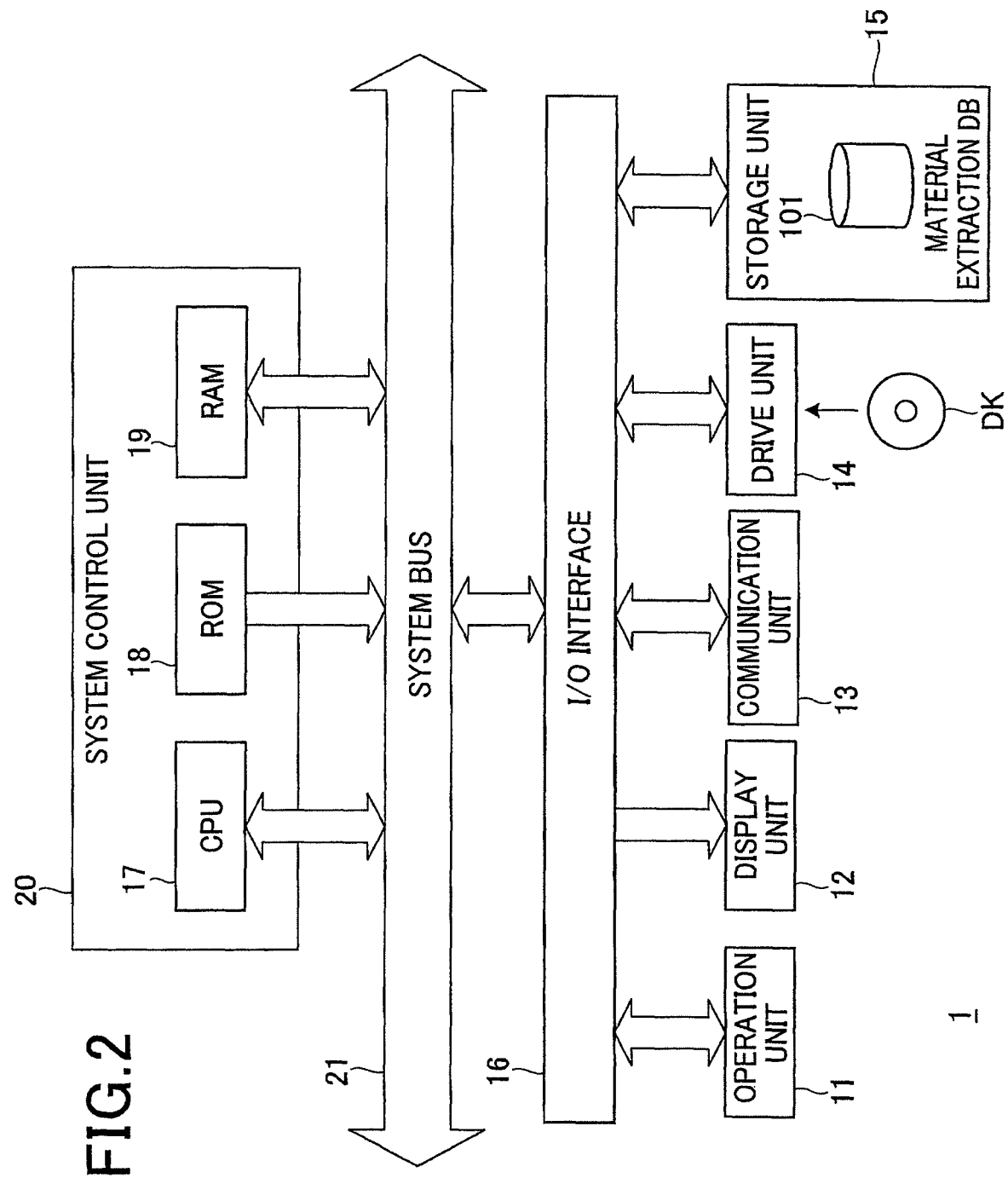
FIG. 2 is a block diagram showing an exemplary schematic structure of a content generation server 1 according to one embodiment.
Figure 3:
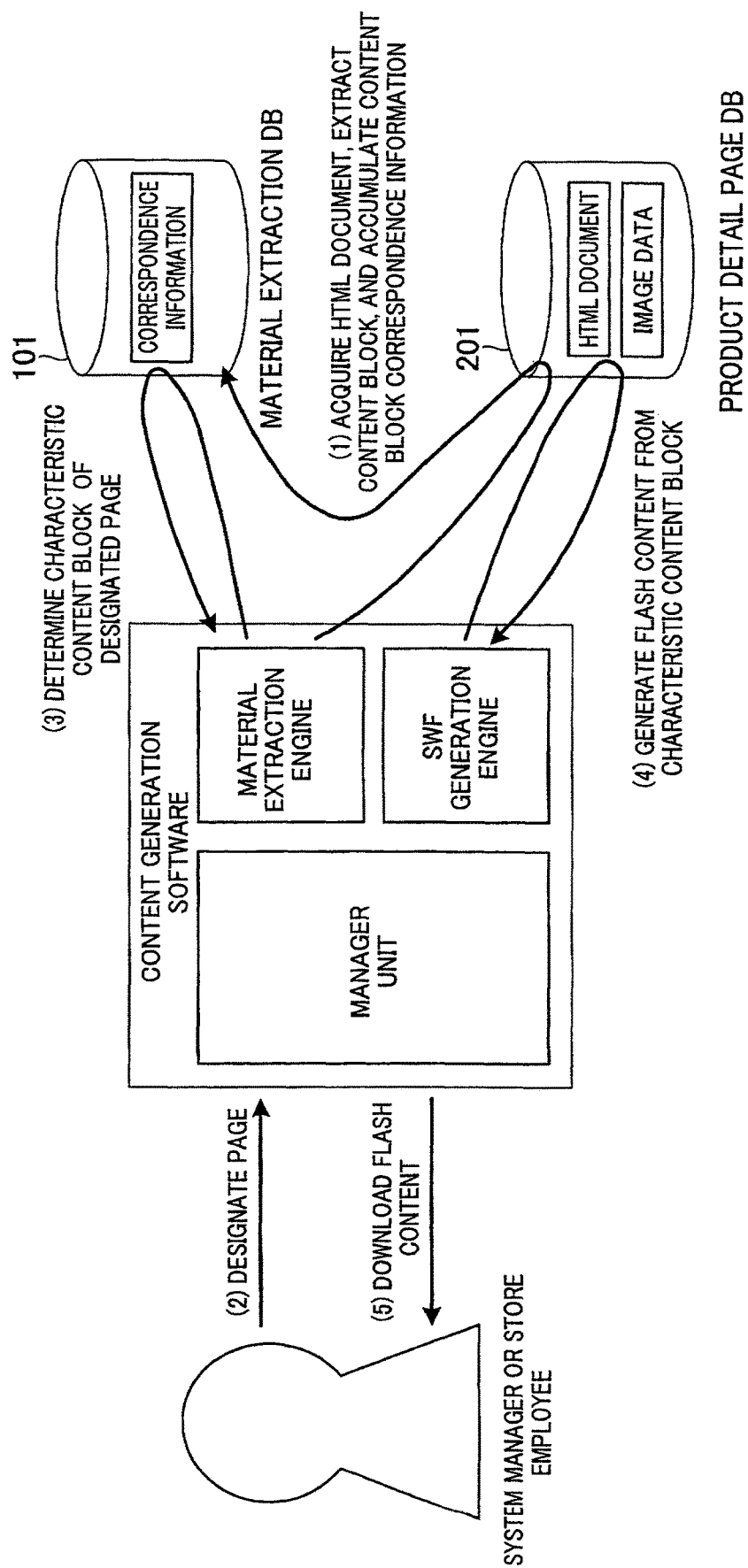
FIG. 3 is a diagram showing an outline of processings from designation of a Web page to generation of a Flash content.
Figure 4:
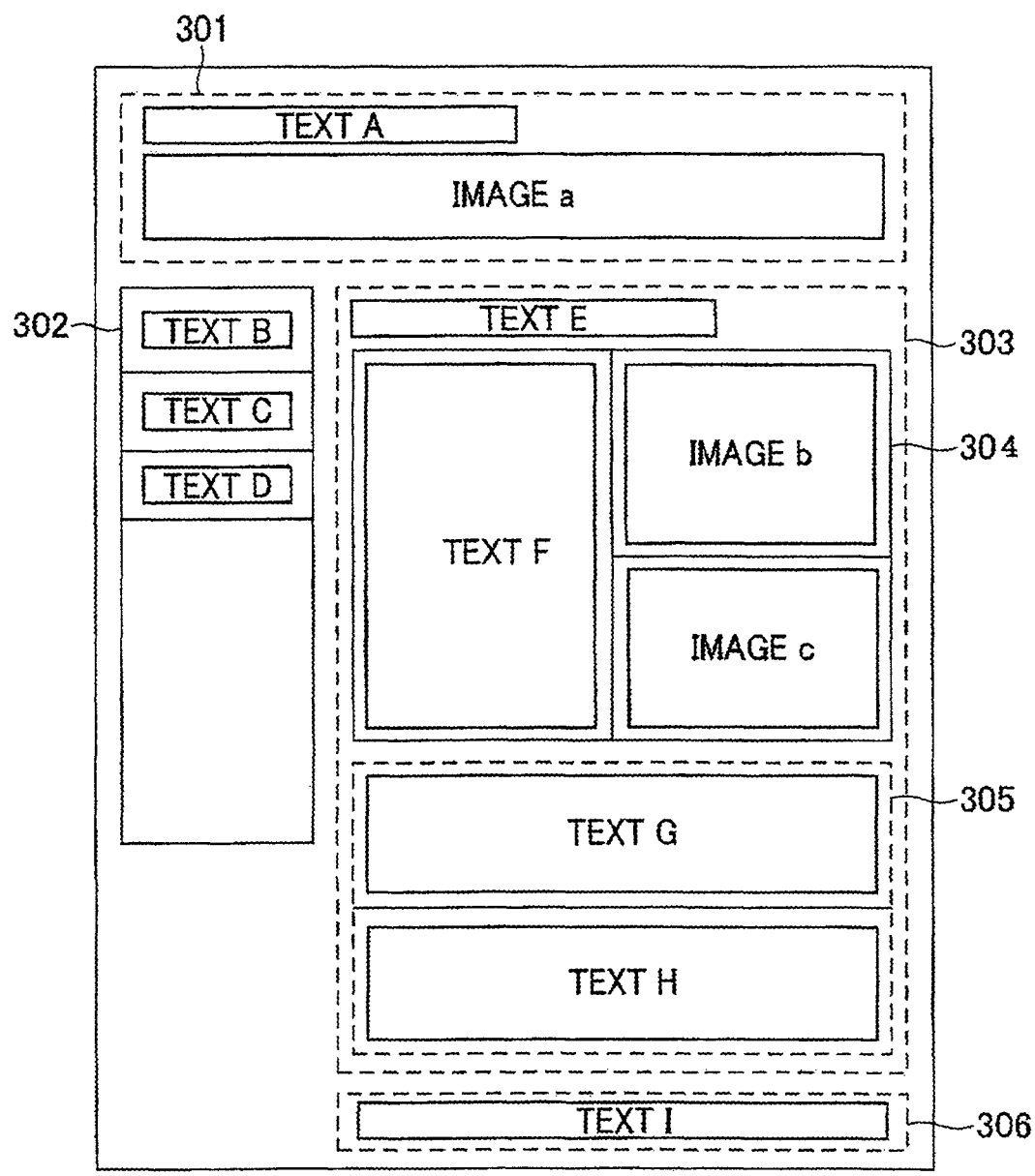
FIG. 4 is a diagram showing an exemplary structure of a Web page.
Figure 5:
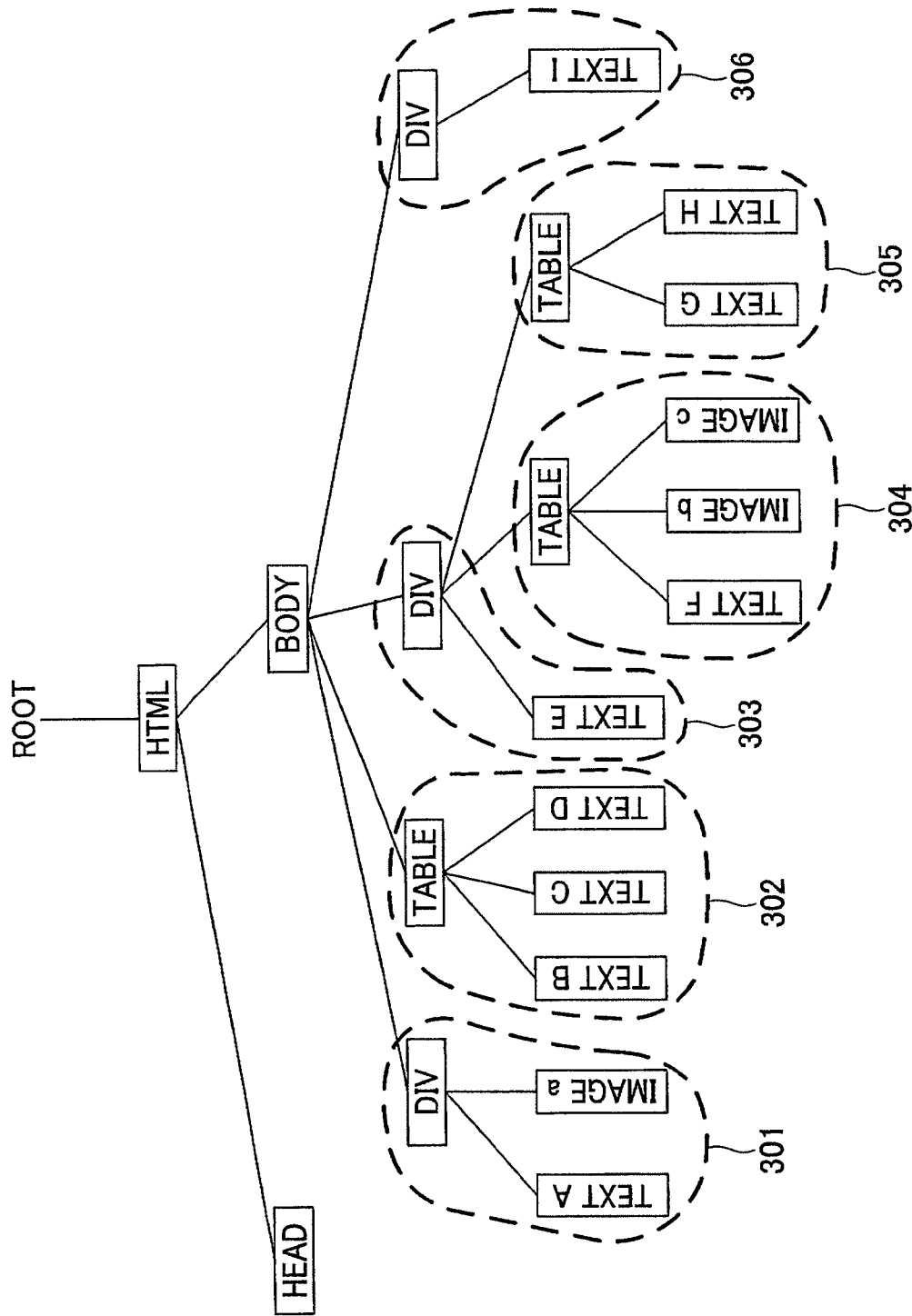
FIG. 5 is a diagram showing an exemplary DOM tree generated from HTML documents.
Figure 6:
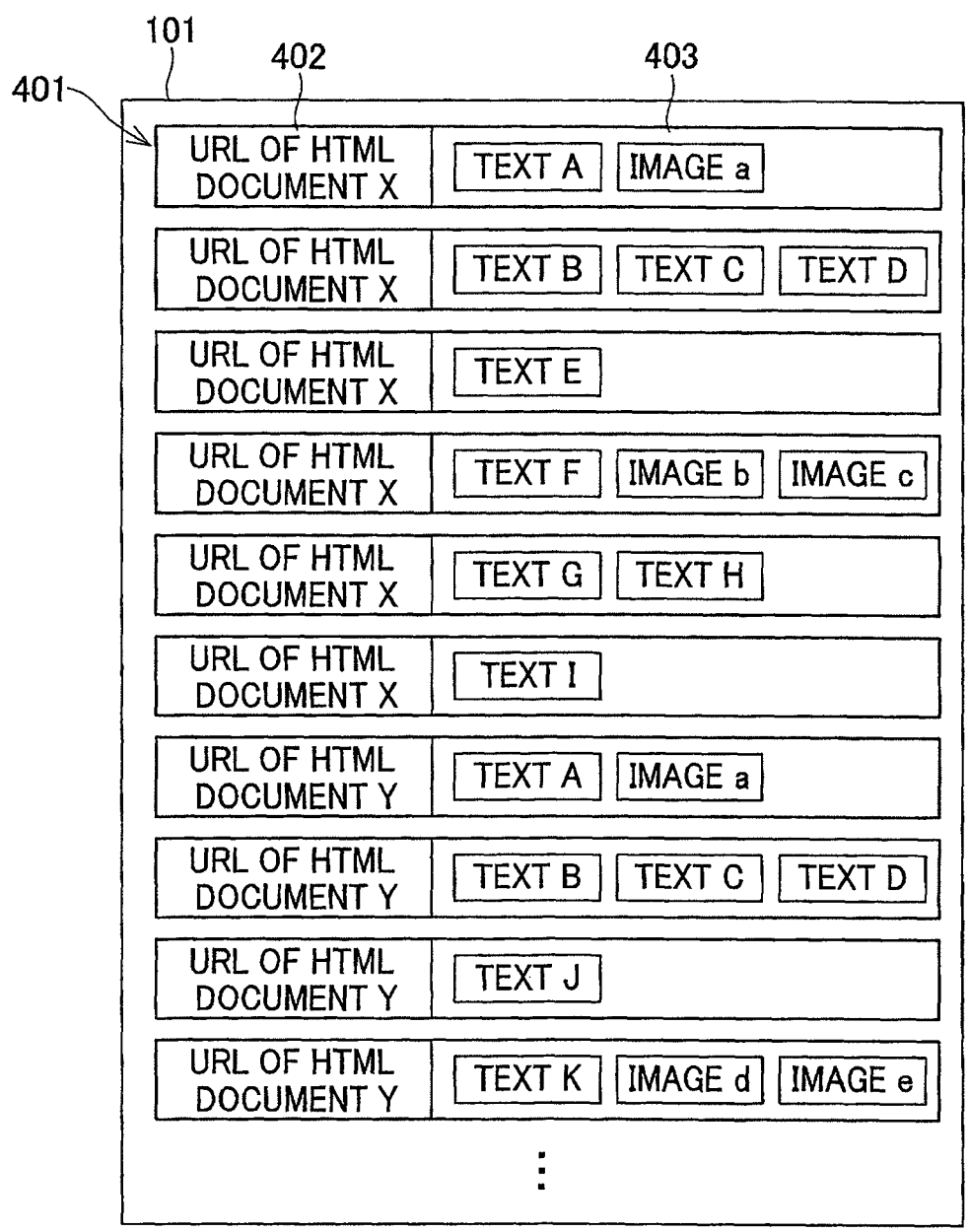
FIG. 6 is a diagram showing exemplary contents of information registered in a material extraction DB 101.

FIG. 2 is a block diagram showing an exemplary schematic structure of the content generation server 1 according to the present embodiment. FIG. 3 is a diagram showing an outline of processings from designation of a Web page to generation of a Flash content. FIG. 4 is a diagram showing an exemplary structure of a Web page. FIG. 5 is a diagram showing an exemplary DOM tree generated from HTML documents. FIG. 6 is a diagram showing exemplary contents of information registered in the material extraction DB 101.

As shown in FIG. 2, the content generation server 1 comprises an operation unit 11, a display unit 12, a communication unit 13, a drive unit 14, a storage unit 15 as exemplary storage means, an I/O interface unit 16, and a system control unit 20. The system control unit 20 and the I/O interface unit 16 are connected to each other via a system bus 21.

The operation unit 11 is configured of a keyboard or a mouse, for example, and is directed for receiving an operation instruction from a system manager or the like and outputting the instruction content as an instruction signal to the system control unit 20. The display unit 12 is configured of a CRT (Cathode Ray Tube) display or a liquid crystal display, for example, and is directed for displaying information such as characters and images. The communication unit 13 is connected to the network NW or the like to control a communication state with the shopping server 2, the management terminal 3, the store terminal 4 or the user terminal 5. The drive unit 14 is directed for reading data from a disc DK such as flexible disc, CD (Compact Disc) or DVD (Digital Versatile Disc) and recording data in the disc DK. The storage unit 15 is configured of a hard disc drive, for example, and stores various programs and items of data therein. The storage unit 15 constructs the material extraction DB 101 therein. The I/O interface unit 16 performs an interface processing between the operation unit 11 to the storage unit 15 and the system control unit 20. The system control unit 20 is configured of a CPU (Central Processing Unit) 17, a ROM (Read Only Memory) 18, a RAM (Random Access Memory) 19, and the like.

The CPU 17 reads and executes various programs stored in the ROM 18 or the storage unit 15 so that the system control unit 20 controls the respective units in the content generation server 1. The system control unit 20 executes a content generation software (exemplary characteristic content determination program) thereby to function as extraction means, calculation means, determination means and generation means. The content generation software or the like may be acquired from other server device via the network NW or may be recorded in the disc DK such as CD-ROM and read via the drive unit 14.

The content generation software is a program for generating a Flash content based on a characteristic content of the product detail page. As shown in FIG. 3, the content generation software is configured of a manager unit, a material extraction engine, a SWF (ShockWave Flash Object) generation engine, and the like. The manager unit is a software for controlling the executions of the material extraction engine and the SWF engine, and providing a GUI (Graphical User Interface) for generating a Flash content to a user (store employee or system manager) utilizing the content generation software. The material extraction engine is a software for extracting a content as a Web material from the HTML documents in the product detail page and determining a characteristic content of the product detail page. The contents are extracted in units of content block (exemplary content group) described later. The SWF engine is a software for generating a Flash content based on one or multiple given contents (Web materials). When a rich Internet application other than the Flash content is generated as a new content, the generation engine by Silverlight (trademark) of Microsoft Corporation may be applied, for example, instead of the SWF generation engine. Alternatively, there may be applied a software for generating a script realizing a dynamic page by use of a technique such as Ajax (Asynchronous JavaScript (trademark)+XML).

An outline of the Flash content generation will be described below. As shown in FIG. 3, the system control unit 20 acquires and analyzes HTML documents registered in the product detail page DB 201 from the shopping server 2, and extracts contents as Web materials in units of content block. Then, content block correspondence information (exemplary content information) is registered in the material extraction DB 101 per extracted content block as the extraction result (1). The processing is previously performed prior to the generation of the Flash content, and basically all the HTML documents registered in the product detail page DB 201, that is, all the product detail pages configuring the shopping site are extracted.

Thereafter, the system manager or store employee designates the URL of a HTML document in the product detail page for which a Flash content is to be generated (2). The system control unit 20 acquires the HTML document from the shopping server 2 based on the designated URL, and extracts a content block. The system control unit 20 refers to the material extraction DB 101 and calculates the frequency of appearance of each extracted content block in all the product detail pages. The frequency of appearance to be calculated may be the number of times of appearance (frequency) or may be a rate of the number of times of appearance relative to all the content blocks in all the product detail pages (relative frequency). The system control unit 20 determines a content block characteristic of the product detail page corresponding to the designated URL based on the frequency of appearance. Specifically, the system control unit 20 determines that a content block with the lowest frequency of appearance is characteristic of the product detail page corresponding to the designated URL (3).

The system control unit 20 acquires a content contained in the content block determined as characteristic from the product detail page DB 201 via the shopping server 2. The system control unit 20 generates a Flash content based on the acquired content (4). Then, the system manager or store employee downloads the generated Flash content (5). Prior to downloading the Flash content, the system manager or store employee may correct the Flash content as needed.

A content block extraction method will be described below. In the present embodiment, it is assumed that text data and image data are extracted as Web materials.

For example, a structure (layout) of the product detail page is assumed as shown in FIG. 4. Each content as Web material is displayed per block on the product detail page. Each block corresponds to a content block. Each content is divided into content blocks by DIV tags and TABLE tags (exemplary predefined tags) described in the HTML documents. In other words, each content is blocked (grouped) by the DIV tags and the TABLE tags. The DIV tags and the TABLE tags are called "blocking tag."

FIG. 4 displays content blocks 301 to 306. The content block 301 is a content block of a header part of a page, for example, and is configured of a text A and an image a. The content block 302 is a content block of a navigation part for moving to Web pages related to products in various categories, for example, and is configured of a text B, a text C and a text D indicating the links to other Web pages, for example. The content block 303 is a content block in which information on products is displayed, for example, and is configured of a text E indicating titles of product names, the content block 304 and the content block 305. In this way, the content blocks may be nested, that is, in a hierarchy structure. In this case, it is assumed that the content contained in the content block 303 is only the text E, and that the content block 304 and the content block 305 are independent from the content block 303. The content block 304 is a content block for indicating the details of the products, for example, and is configured of a text F indicating detailed explanations, an image b and an image c as images of the products. The content block 305 is a content block for indicating typical precautions for product purchase, for example, and is configured of a text G and a text H. The content block 306 is a content block for displaying a copyright, for example, and is configured of a text I.

The content blocks 301, 302, 305 and 306 among the content blocks relatively frequently appear also on the product detail pages other than the product detail page shown in FIG. 4. On the other hand, the content block 303 (text E) and the content block 304 are used only for the product detail page, and even if used for other product detail page, the frequency of appearance thereof is lower than that of the content blocks 301, 302, 305 or 306. Thus, for example, the content block 303 or the content block 304 is determined as characteristic of the product detail page.

FIG. 5 represents the HTML documents in the product detail page shown in FIG. 4 in a DOM (Document Object Mode) tree, that is, in a tree structure. Nodes of the tags not necessary for the explanation of the present embodiment will be omitted from the DOM tree shown in FIG. 5.

In the DOM tree, the DIV node indicating the DIV tag and the TABLE node indicating the TABLE tag are assumed as the nodes for blocking each content into a content block (which will be called "blocking node" below). The system control unit 20 searches the DOM tree by the depth-first search, for example, and defines the content blocks. Specifically, when finding a blocking node, the system control unit 20 keeps the contents defined at the respective nodes of the partial trees with the node as the apex all together for a content block. As a result of the content blocks defined in a hierarchy manner, when a blocking node (which will be called "higher blocking node" below) is found and then a blocking node (which will be called "lower blocking node" below) is further found from among the descendent nodes of the blocking nodes, the content block is divided. For example, assuming that a node closer to the root node is a higher node in the hierarchy, the content blocks corresponding to the partial trees (which will be called "higher partial trees" below) with the higher blocking node as the apex are divided into the content blocks corresponding to the partial trees (which will be called "lower partial trees" below) with the lower blocking node as the apex and the content blocks (such as the content block 304 and the content block 303) corresponding to the parts other than the lower partial trees among the higher partial trees. In this case, it is assumed that the former content blocks are lower than the latter content blocks in the hierarchy. For example, the hierarchy of the content blocks 301, 302, 303 and 306 is 1 and the hierarchy of the content blocks 304 and 305 is 2. That is, a hierarchy with a smaller value is higher in the hierarchy.

With the explanation by the description of the tags of the HTML documents, basically, when the blocking tags are described, the contents whose definitions are described in a range between the blocking tags are collectively assumed as a content block corresponding to the blocking tag. When the blocking tags are described in a hierarchy, contents other than the contents whose definitions are described in the range between some blocking tags described lower than the blocking tags among the contents whose definitions are described in the range between the blocking tags are collectively assumed as content blocks corresponding to the blocking tags.

When the content block is extracted in this manner, the system control unit 20 registers content block correspondence information indicating the extraction result in the material extraction DB 101. As shown in FIG. 6, the content block correspondence information (numeral 401) is registered per content block. The content block correspondence information is configured of a URL setting part (numeral 402) of the HTML document at the extraction source and block configuration information (numeral 403). The block configuration information sets each extracted content therein. The content of the text node in the DOM tree is set for the text data. On the other hand, for the image data, the URL of the image data as a src attribute of an IMG node indicating an IMG tag is set in the DOM tree in place of the image data itself.

[1-3. Operations of Shopping System]

The operations of the shopping system S will be described below with reference to FIGS. 7 to 12.

[1-3-1. Extraction of Content Block from all Product Detail Pages]

Figure 7:
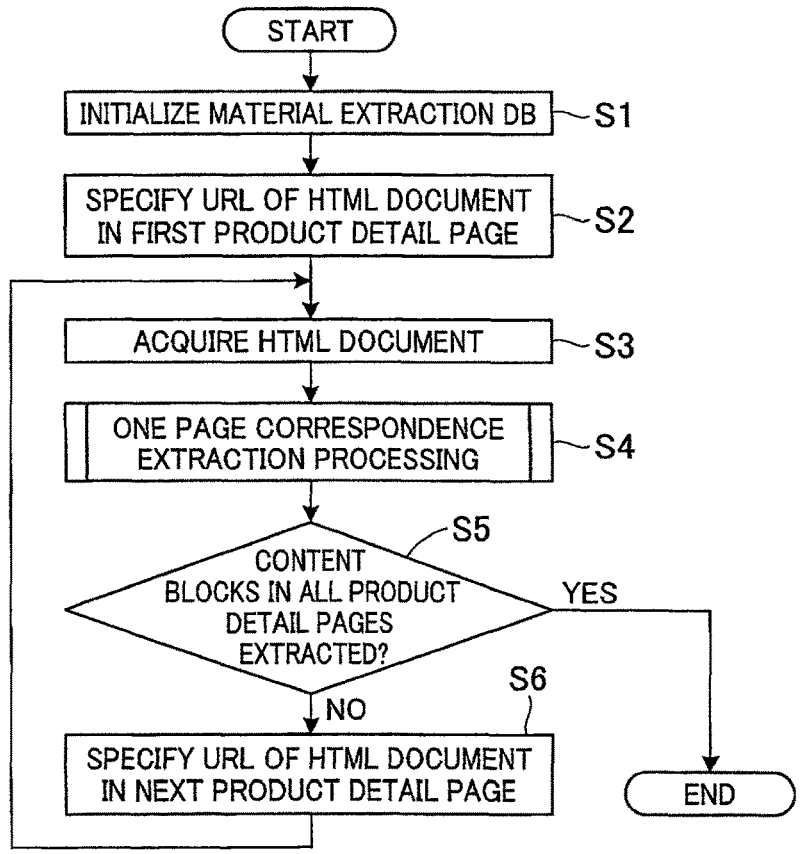
FIG. 7 is a flowchart showing exemplary processings in a material extraction processing by a system control unit 20 in the content generation server 1 according to one embodiment.

FIG. 7 is a flowchart showing exemplary processings in a material extraction processing by the system control unit 20 in the content generation server 1 according to the present embodiment.

The material extraction processing is periodically executed, or is started when a request of executing the material extraction processing is transmitted from the management terminal 3 based on a system manager's operation, for example. In the material extraction processing, the system control unit 20 analyzes all the HTML documents registered in the product detail page DB 201. Therefore, the system control unit 20 may previously acquire information on a list of HTML documents registered in the product detail page DB 201 from the shopping server 2 and acquire a HTML document based on the information on the list, or may follow the links from the HTML document on the top page of the shopping site in sequence and sequentially acquire the HTML documents in the product detail page, for example.

As shown in FIG. 7, the system control unit 20 initializes the material extraction DB 101 (step S1). Specifically, when the content block correspondence information is registered in the material extraction DB 101, the system control unit 20 deletes all the content block correspondence information from the material extraction DB 101.

Then, the system control unit 20 specifies the URL of the HTML document in the product detail page to be initially acquired among all the product detail pages (step S2), and transmits a request setting the specified URL therein to the shopping server 2 thereby to acquire the HTML document from the shopping server 2 (step S3). Then, the system control unit 20 designates the acquired HTML document and executes a page correspondence extraction processing described later (step S4). In the page correspondence extraction processing, a content block is extracted from the acquired HTML document and content block correspondence information is registered.

Then, the system control unit 20 determines whether the content blocks in all the product detail pages have been extracted (step S5). At this time, when a product detail page for which a content block has not been extracted is present (step S5: NO), the system control unit 20 specifies the URL of the HTML document in a next product detail page (step S6) and proceeds to step S3. The system control unit 20 repeats the processings in steps S3 to S6 to extract the content blocks in all the product detail pages (step S5: YES), and then terminates the material extraction processing.

The system control unit 20 may not initialize the material extraction DB 101 and re-register the content block correspondence information. For example, the system control unit 20 may generate the content block correspondence information for the newly-generated product detail page after the previous material extraction processing is executed without the initialization of the material extraction DB 101, thereby to add and register the same in the material extraction DB 101, and may generate the content block correspondence information for the updated product detail page after the previous material extraction processing is executed, thereby to update and register the same in the material extraction DB 101.

Figure 8:
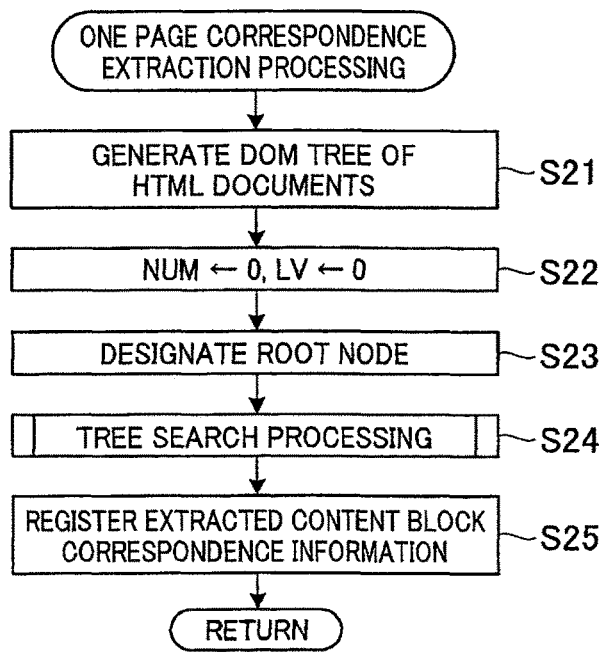
FIG. 8 is a flowchart showing exemplary processings in a page correspondence extraction processing by the system control unit 20 in the content generation server 1 according to one embodiment.

FIG. 8 is a flowchart showing exemplary processing in the page correspondence extraction processing by the system control unit 20 in the content generation server 1 according to the present embodiment.

As shown in FIG. 8, the system control unit 20 first generates a DOM tree of the acquired HTML documents on the RAM 19 (step S21).

Then, the system control unit 20 sets the number of blocks NUM at 0 and sets the hierarchy LV at 0 (step S22). The number of blocks NUM is the number of content blocks found at this point of time. The hierarchy LV is a hierarchy level of the content block to which a currently-searched node belongs in the DOM tree. Both NUM and LV are global variables, and can be accessed from the page correspondence extraction processing and the tree search processing described later.

Then, the system control unit 20 designates a root node of the DOM tree (step S23) and executes the tree search processing (step S24). The tree search processing can be recursively called, and all the content blocks are extracted from the Web page and the content block correspondence information is generated by the tree search processing.

The system control unit 20 registers each item of content block correspondence information generated by the tree search processing in the material extraction DB 101 (step S25). When terminating the processing, the system control unit 20 terminates the page correspondence extraction processing.

Figure 9:
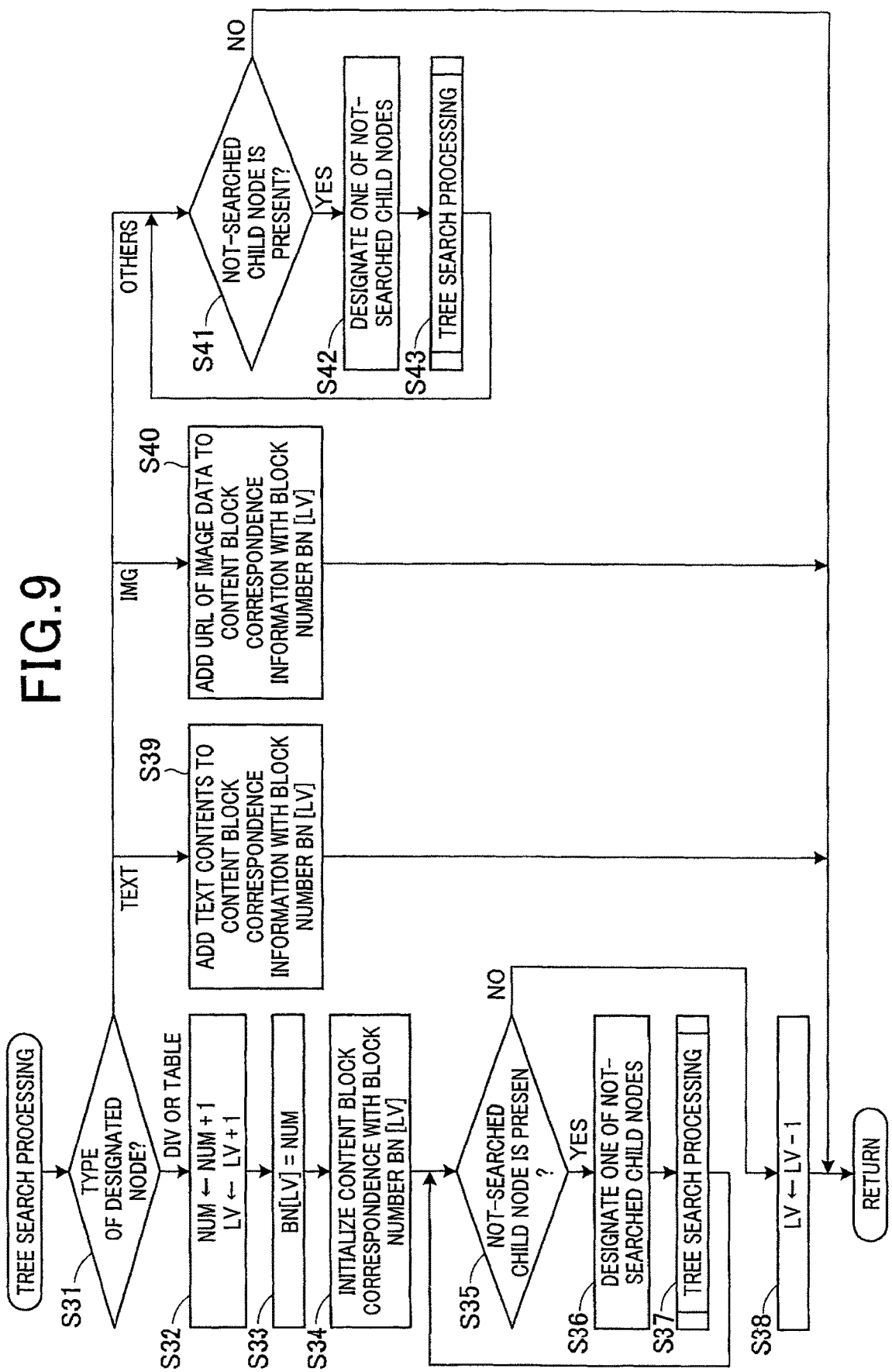
FIG. 9 is a flowchart showing exemplary processings in a tree search processing by the system control unit 20 in the content generation server 1 according to one embodiment.

FIG. 9 is a flowchart showing exemplary processings in the tree search processing by the system control unit 20 in the content generation server 1 according to the present embodiment.

As shown in FIG. 9, the system control unit 20 first determines a type of the designated node (step S31). At this time, when the type of the designated node is a DIV node or TABLE node (blocking node), that is, when a content block is found (step S31: DIV or TABLE), the system control unit 20 proceeds to step S32.

In step S32, the system control unit 20 adds 1 to the number of blocks NUM and adds 1 to the hierarchy LV. Then, the system control unit 20 sets a block number BN [LV] at NUM (step S33). The block number BN [LV] is a block number of a content block indicated by the hierarchy LV to which a currently-searched node belongs. The block number is given in an order in which the content block is found. BN [LV] is a global variable.

The system control unit 20 initializes the content block correspondence information corresponding to the content block with the block number BN [LV] (step S34). Specifically, the system control unit 20 sets an area in which the content block correspondence information is stored on the RAM 19, and sets the URL of the acquired HTML document in the area.

The system control unit 20 determines whether a not-searched child node is still present among the child nodes of the designated node (step S35). At this time, when a not-searched child node is still present (step S35: YES), the system control unit 20 proceeds to step S36.

In step S36, the system control unit 20 designates one child node among the not-searched child nodes, and executes the tree search processing (step S37). When terminating the tree search processing, the system control unit 20 proceeds to step S35.

The system control unit 20 repeats the processings in steps S35 to S37 to terminate the tree search processing on all the child nodes (step S35: NO), and then proceeds to step S38. Also when no child node of the designated node is present, the system control unit 20 proceeds to step S38. In step S38, the system control unit 20 subtracts 1 from the hierarchy LV and terminates the tree search processing.

In step S31, when the type of the designated node is a text node (step S31: text), the system control unit 20 adds and sets the content (text data) of the designated node to the block configuration information in the content block correspondence information corresponding to the content block with the block number BN [LV] (step S39). When terminating the processing, the system control unit 20 terminates the tree search processing.

In step S31, when the type of the designated node is an IMG node (step S31: IMG), the system control unit 20 acquires the URL of the image data set as a src attribute of the designated node, and adds and sets the acquired URL to the block configuration information in the content block correspondence information corresponding to the content block with the block number BN [LV] (step S40). When terminating the processing, the system control unit 20 terminates the tree search processing.

In step S31, when the type of the designated node is none of DIV node, TABLE node, text node and IMG node (step S31: others), the system control unit 20 determines whether a not-searched child node is present among the child nodes of the designated node (step S41). At this time, when a not-searched child node is present (step S41: YES), the system control unit 20 designates one child node among the not-searched child nodes (step S42) and executes the tree search processing (step S43). When terminating the tree search processing, the system control unit 20 proceeds to step S41.

On the other hand, when terminating the tree search processing on all the child nodes of the designated node or when no child node of the designated node is present (step S41: NO), the system control unit 20 terminates the tree search processing.

[1-3-2. Generation of Flash Content]

Figure 10:
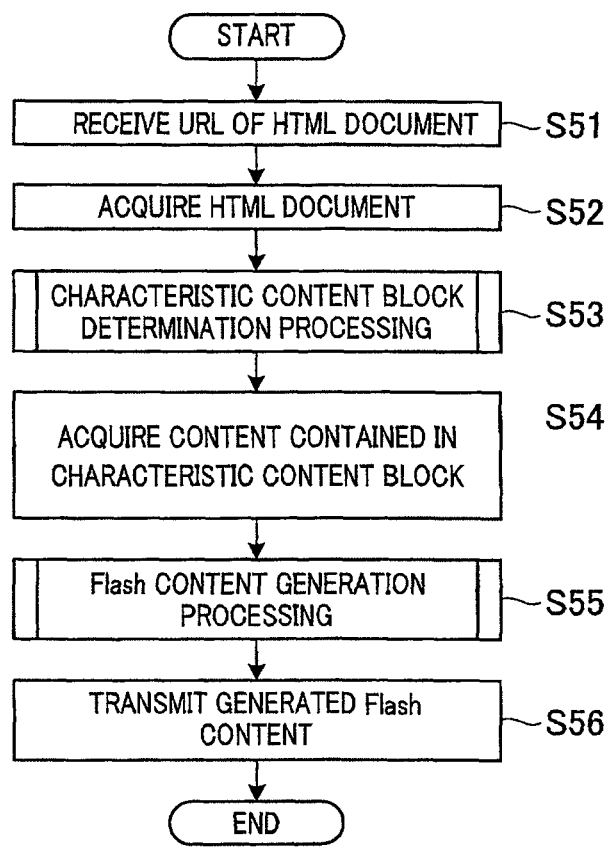
FIG. 10 is a flowchart showing exemplary processings in a content generation processing by the system control unit 20 in the content generation server 1 according to one embodiment.

FIG. 10 is a flowchart showing exemplary processings in a content generation processing by the system control unit 20 in the content generation server 1 according to the present embodiment.

The content generation processing is started when a request of executing the content generation processing is transmitted from the management terminal 3 based on a system manager's operation or when a request of executing the content generation processing is transmitted from the store terminal 4 based on a store employee's operation.

When the system manager or store employee designates the URL of the HTML document for which a Flash content is to be generated, the system control unit 20 receives the designated URL from the management terminal 3 or the store terminal 4 as shown in FIG. 10 (step S51). The system control unit 20 transmits a request setting the received URL therein to the shopping server 2 thereby to acquire the HTML document from the shopping server 2 (step S52).

The system control unit 20 designates the acquired HTML document and executes a characteristic content block determination processing described later (step S53). In the characteristic content block determination processing, a content block is extracted from the acquired HTML document and a content block characteristic of the HTML document is determined.

The system control unit 20 acquires each content constituting the content block determined as characteristic (step S54). At this time, in order to acquire text data, the system control unit 20 acquires the text data from the content block correspondence information corresponding to the content block determined as characteristic. On the other hand, in order to acquire image data, the system control unit 20 acquires the URL of the image data from the content block correspondence information corresponding to the content block determined as characteristic and transmits a request setting the acquired URL therein to the shopping server 2 thereby to acquire the image data registered in the product detail page DB 201 from the shopping server 2.

Then, the system control unit 20 designates all the acquired contents and executes a Flash content generation processing described later (step S55).

The system control unit 20 transmits a Flash content generated in the Flash content generation processing to the management terminal 3 or the store terminal 4 as generation request source (step S56). When terminating the processing, the system control unit 20 terminates the content generation processing.

Figure 11:
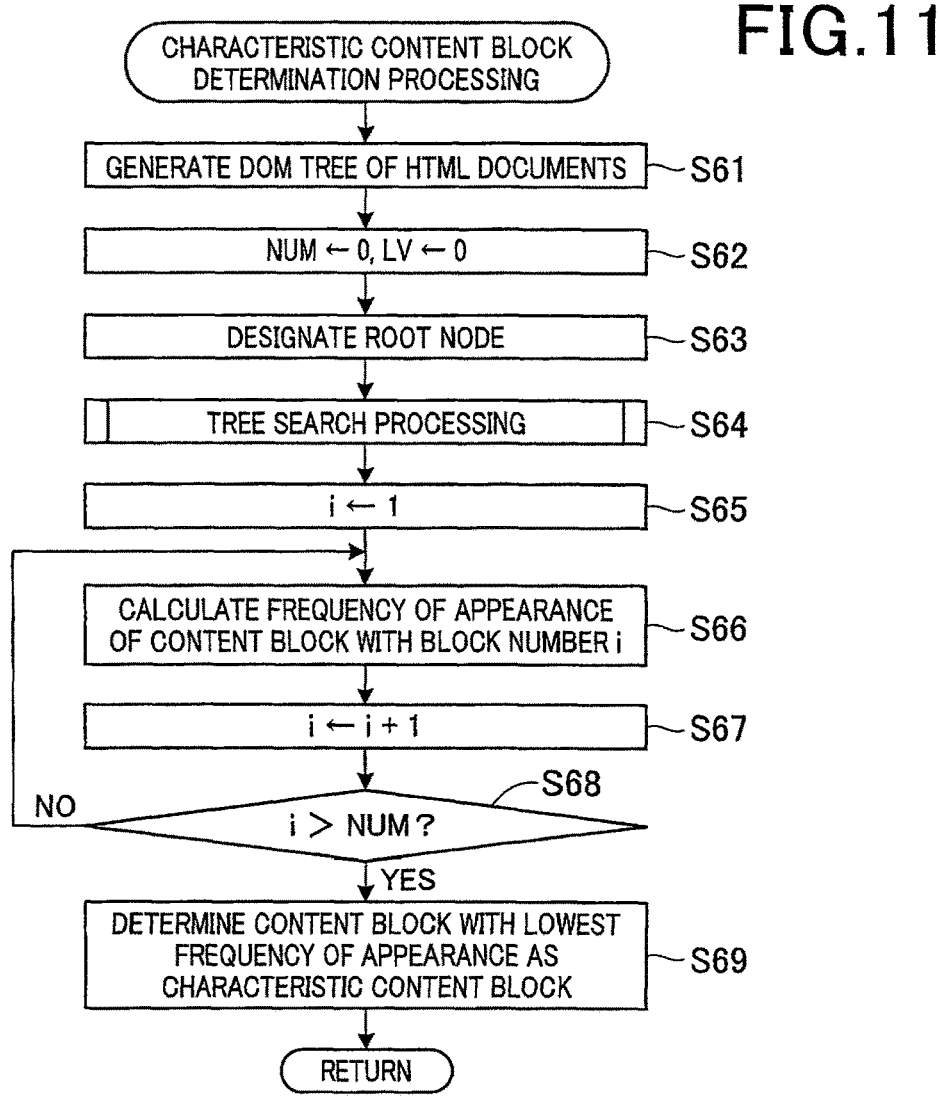
FIG. 11 is a flowchart showing exemplary processings in a characteristic content block determination processing by the system control unit 20 in the content generation server 1 according to one embodiment.

FIG. 11 is a flowchart showing exemplary processings in a characteristic content block determination processing by the system control unit 20 in the content generation server 1 according to the present embodiment.

As shown in FIG. 11, the system control unit 20 first generates a DOM tree of the acquired HTML documents similarly to the page correspondence extraction processing (step S61), sets the number of blocks NUM and the hierarchy LV at 0 (step S62), designates a root node of the DOM tree (step S63), and thereby executes the tree search processing (step S64).

Then, the system control unit 20 sets the block number i at 1 (step S65). The system control unit 20 calculates the frequency of appearance of a content block with the block number i (step S66).

Specifically, the system control unit 20 compares the block configuration information of content block correspondence information i (content block correspondence information corresponding to the content block with the block number 1) generated in the tree search processing with the block configuration information of each item of content block correspondence information registered in the material extraction DB 101. When the contents of the block configuration information match, the system control unit 20 counts the frequency of appearance by one. At this time, the system control unit 20 may ignore the order of defining the contents in the block configuration information. Also when some contents defined in the block configuration information of the content block correspondence information registered in the material extraction DB 101 match with all the contents defined in the block configuration information of the content block correspondence information i, the system control unit 20 may count the frequency of appearance by one. Further, when the items of text data defined in the items of block configuration information of the items of content block correspondence information are compared with each other, the system control unit 20 may compare the substantial contents expressed in sentences, not determining whether the sentences indicated by the text data match with each other. For example, the system control unit 20 may extract words from the text data by way of the morphological analysis of the respective items of text data, and may compare the extracted words. The system control unit 20 may determine that the items of text data match with each other when all the words match, or may determine that the items of text data match with each other when the words match at a predetermined rate or more. The system control unit 20 compares the block configuration information of the content block correspondence information i with the block configuration information of all the content block correspondence information registered in the material extraction DB 101 in the above way, and thereby calculates the frequency of appearance.

When calculating the frequency of appearance, the system control unit 20 adds 1 to the block number i (step S67), and determines whether the block number i is larger than the value of the number of blocks NUM (step S68). At this time, when the block number i is the value of the number of blocks NUM or less (step S68: NO), the system control unit 20 proceeds to step S66. Then, the system control unit 20 calculates the frequencies of appearance of all the content blocks extracted in the tree search processing (step S68: YES), and then proceeds to step S69.

In step S69, the system control unit 20 compares the frequencies of appearance of all the content blocks from the content block 1 to the content block with the block number indicated by the number of blocks NUM, and determines that a content block with the lowest frequency of appearance is a characteristic content block (step S69). When terminating the processing, the system control unit 20 terminates the characteristic content block determination processing.

Figure 12:
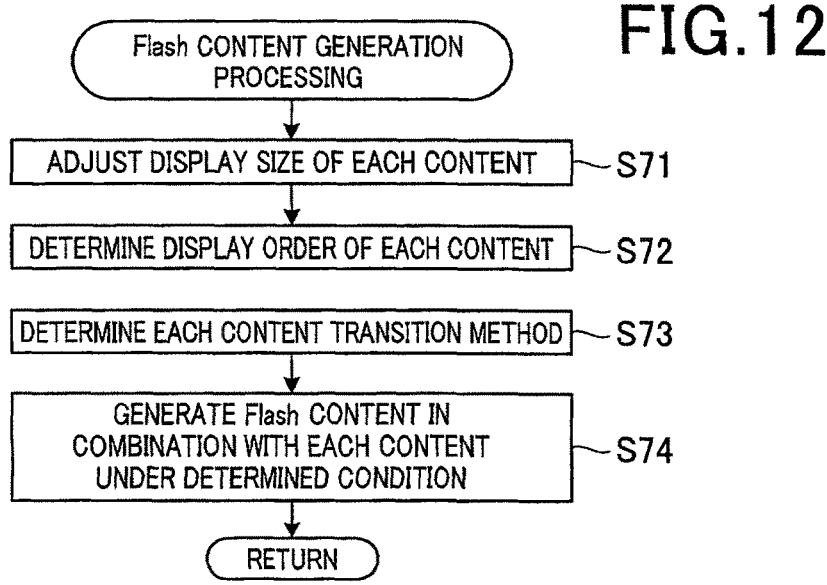
FIG. 12 is a flowchart showing exemplary processings in a Flash content generation processing by the system control unit 20 in the content generation server 1 according to one embodiment.

FIG. 12 is a flowchart showing exemplary processings in the Flash content generation processing by the system control unit 20 in the content generation server 1 according to the present embodiment. In the present embodiment, there will be described such that the Flash content for displaying the respective contents contained in the content block determined as characteristic in a slide show is generated as the content introducing the products posted on the product detail page.

As shown in FIG. 12, the system control unit 20 first adjusts a display size of each designated content (step S71). For example, the system control unit 20 adjusts the numbers of longitudinal and horizontal pixels in image data or adjusts a font size of text data in accordance with the actual display size during reproduction of the Flash content. When the display size of the content is much larger than the actual display size during reproduction of the Flash content, the system control unit 20 divides the content into multiple pieces. When the display size of the content is much smaller than the actual display size during reproduction of the Flash content, the system control unit 20 combines multiple contents into one.

Then, the system control unit 20 determines a display order of each content (step S72). The display order of each content is basically the same as the content setting order for the content block correspondence information in the tree search processing. That is, a content defined closer to the head of the HTML document is earlier displayed.

The system control unit 20 determines a method for transiting each content (step S73). That is, the system control unit 20 determines an effect (display effect) performed when a content to be displayed is switched in the slide show display. The effect is fade-in/fade-out, slide, random block, wiping and no effect, for example.

The system control unit 20 generates a Flash content based on each content adjusted in step S71 and based on a condition determined in steps S72 and S73 (step S74). When terminating the processing, the system control unit 20 terminates the Flash content generation processing.

As described above, according to the present embodiment, the system control unit 20 in the content generation server 1 extracts a content constituting a product detail page corresponding to the designated URL, calculates the frequency of appearance of each content constituting the product detail page corresponding to the designated URL, and determines that a content with the lowest frequency of appearance among the contents constituting the product detail page corresponding to the designated URL is characteristic of the product detail page.

Thus, since a content with a lower frequency of appearance rarely appears on the pages other than the designated product detail page, the content with the lowest frequency of appearance is determined and thus the characteristic content of the designated product detail page is specified. Thus, a characteristic content of the product detail page can be easily extracted.

The system control unit 20 in the content generation server 1 generates a Flash content based on the content determined as characteristic of the product detail page.

Therefore, a content clearly indicating the contents of the product on the product detail page or indicating the characteristics thereof can be generated.

The system control unit 20 in the content generation server 1 calculates the frequency of appearance of each content on the product detail pages contained in the shopping site.

Thus, since the frequency of appearance of each content constituting the designated product detail page is calculated on the Web pages contained in the shopping site, the content commonly used within the shopping site can be determined as not-characteristic, thereby enhancing a determination accuracy.

The system control unit 20 in the content generation server 1 extracts a content constituting a product detail page for all the product detail pages constituting the shopping site, previously registers content block correspondence information on the extracted content in the material extraction DB 101, and calculates the frequency of appearance of each content constituting the product detail page corresponding to the designated URL based on each item of content block correspondence information registered in the material extraction DB 101.

Thus, since the frequency of appearance is calculated based on all the product detail pages, an accuracy of determining a characteristic content can be enhanced.

The system control unit 20 in the content generation server 1 extracts contents constituting a product detail page in units of content block configured of one or more contents, calculates the frequency of appearance of each content block constituting the product detail page corresponding to the designated URL, and determines that a content block with the lowest frequency of appearance among the content blocks constituting the product detail page corresponding to the designated URL is characteristic of the product detail page.

Thus, when one or more contents are displayed together in a content block in the product detail page, such as header part, navigation part, product detail part, part indicating typical precautions for product purchase, and copyright display part, a content block characteristic of the product detail page can be extracted.

The system control unit 20 in the content generation server 1 extracts a content constituting a product detail page based on a HTML document in the product detail page, and defines a content block based on a DIV tag or a TABLE tag in the HTML document.

Since one or more contents clearly blocked in creating a HTML document can be specified by the DIV tag and one or more blocked contents displayed in a table can be specified by the TABLE tag, an accuracy of determining a characteristic content of the Web page can be enhanced by the tags when the characteristic contents of the product detail page and the not-characteristic contents are blocked together, for example.

In the first embodiment, the content block correspondence information corresponding to each content block constituting the designated product detail page is compared with all the items of content block correspondence information registered in the material extraction DB 101, thereby calculating each frequency of appearance. That is, there is configured such that when the frequency of appearance of each content block constituting the designated product detail page is calculated, the frequency of appearance for all the product detail pages contained in the shopping site is calculated, but the calculation is not necessary for all the product detail pages. For example, the target stores may be designated and the frequency of appearance for all the product detail pages corresponding to the designated stores may be calculated. Further, for example, a predetermined number of product detail pages may be targeted.

A content block may not be previously extracted from the product detail page. For example, when a Flash content is generated, a content block may be extracted for each product detail page needed for calculating the frequency of appearance.

The first embodiment is configured such that when the URL of a HTML document in the product detail page is designated by the system manager or the store employee, a Flash content is generated, but when a new product detail page is created or when a product detail page is updated, a Flash content for the newly-created or updated product detail page may be generated.

The first embodiment is configured such that only a content block with the lowest frequency of appearance is characteristic of the Web page, but N content blocks from the content block with the lowest frequency of appearance to the content block with the N-th (N is a natural number of 2 or more) lowest frequency of appearance may be assumed as characteristic of the Web page. This is applicable to a case in which two or more content blocks needed for a desired processing are previously defined, for example. For example, when the number of contents (not content blocks) needed for a desired processing is predetermined at two or more, if the contents contained in the content block with the lowest frequency of appearance are not enough, the content block with the second lowest frequency of appearance is permitted to add as characteristic contents of the Web page, and if the contents contained in the content block with the lowest frequency of appearance and the content block with the second lowest frequency of appearance are not enough, the content block with the third lowest frequency of appearance is permitted to add as characteristic contents of the Web page.

The first embodiment is configured such that a characteristic content of a Web page is used to generate a Flash content, but contents (such as animation data, still image data and electronic documents) other than the Flash content may be generated.

The application of the characteristic contents of the Web page is not limited to the generation of a new content. For example, image data characteristic of a Web page is determined, and the image data determined as characteristic may be displayed as image data representative of the Web page on the search result or the like.

2. Second Embodiment

A second embodiment of the present invention will be described below with reference to the drawings. The embodiment described below is when the present invention is applied to a server device for transmitting a blog page in the blog system for providing a blog service.

[2-1. Outline of Structure and Functions of Blog System]

A structure and schematic functions of a blog system BS according to the present embodiment will be first described with reference to FIG. 13.

Figure 13:
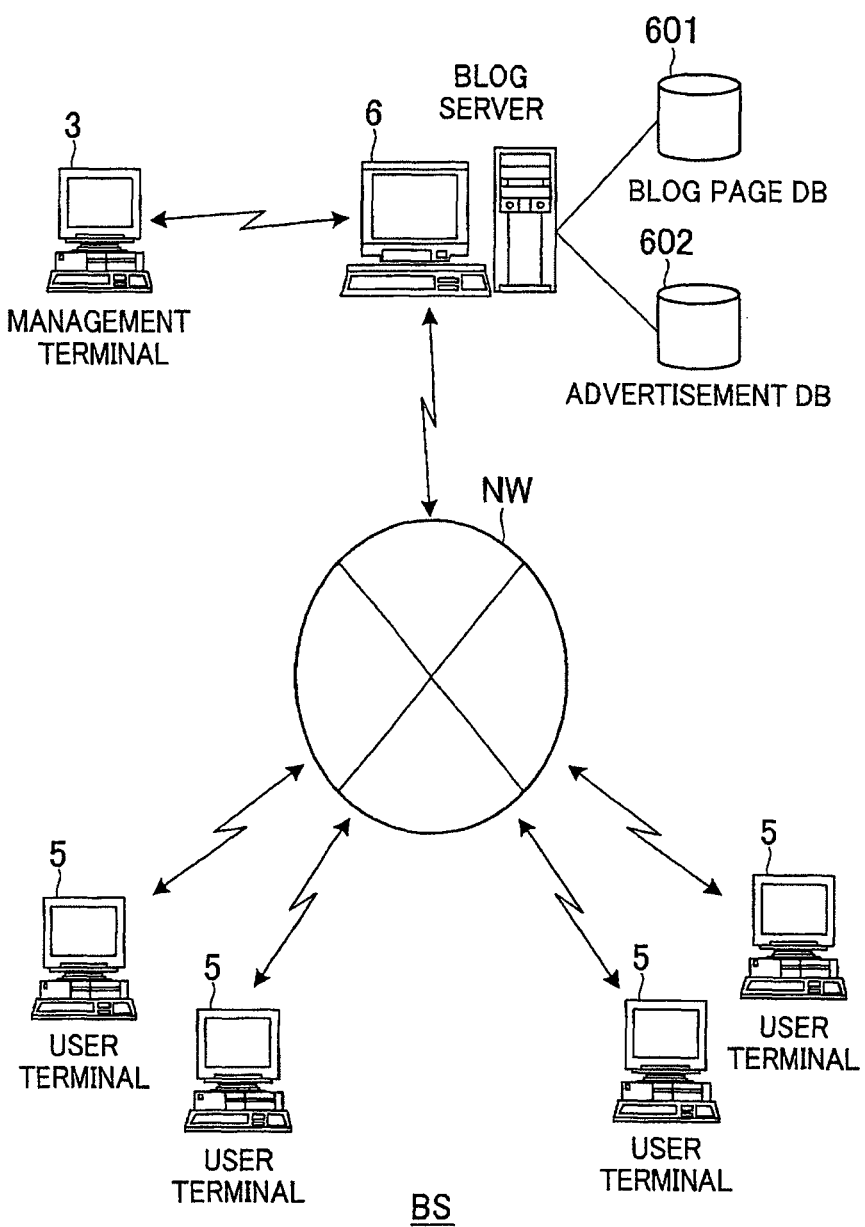
FIG. 13 is a diagram showing an exemplary schematic structure of a blog system BS according to one embodiment.

FIG. 13 is a diagram showing an exemplary schematic structure of the blog system BS according to the present embodiment. In FIG. 13, like reference numerals are denoted to like elements similar to those of FIG. 1.

As shown in FIG. 13, the blog system BS includes a blog server 6 as exemplary characteristic content determination device and related content insertion device, the management terminal 3 and the user terminals 5. The blog server 6 and each user terminal 5 can mutually exchange data by use of a communication protocol such as TCP/IP via the network NW. The blog server 6 and the management terminal 3 are connected with each other via the network such as LAN.

In the thus-configured blog system BS, the blog server 6 is a Web server for transmitting Web pages constituting a blog service site in response to a request from the user terminal 5. When a user utilizing the user terminal 5 registers on the blog service site, the user can manage his/her own blog on the blog service site. The registered user (blogger) can access the blog service site and update his/her blog (add a blog article (record one blog)). Thus, the blog server 6 generates or updates a blog page on which one or more blog articles are posted as a blog Web page in response to blog update. Then, the blog server 6 comprises a blog page DB 601, and registers the blog pages in the blog page DB 601.

The blog server 6 inserts an advertisement content (exemplary related content) into the blog pages of the blogger designated by the system manager. The advertisement content includes text data of advertisement sentences, banner image data, animation data, and rich Internet application (RIA) generated by Adobe Flash (trademark) or Silverlight (trademark), for example. The advertisement content inserted into each blog page indicates an advertisement of a product or service related to the blog articles posted on the target blog page. The blog server 6 comprises an advertisement DB 602 registering multiple advertisement contents therein. Then, the blog server 6 extracts a blog article from the blog page, further extracts a characteristic word from the blog article, and selects an advertisement content related to the extracted characteristic word.

The user terminal 5 is a terminal device used by a user as blogger or a user browsing a blog. The user terminal 5 employs a personal computer, a PDA or a cell phone, for example.

The management terminal 3 is a terminal device used by a system manager of the blog system BS. The management terminal 3 employs a personal computer, for example.

[2-2. Structure and Functions of Blog Server]

A structure and functions of the blog server 6 will be described below with reference to FIG. 14.

Figure 14:
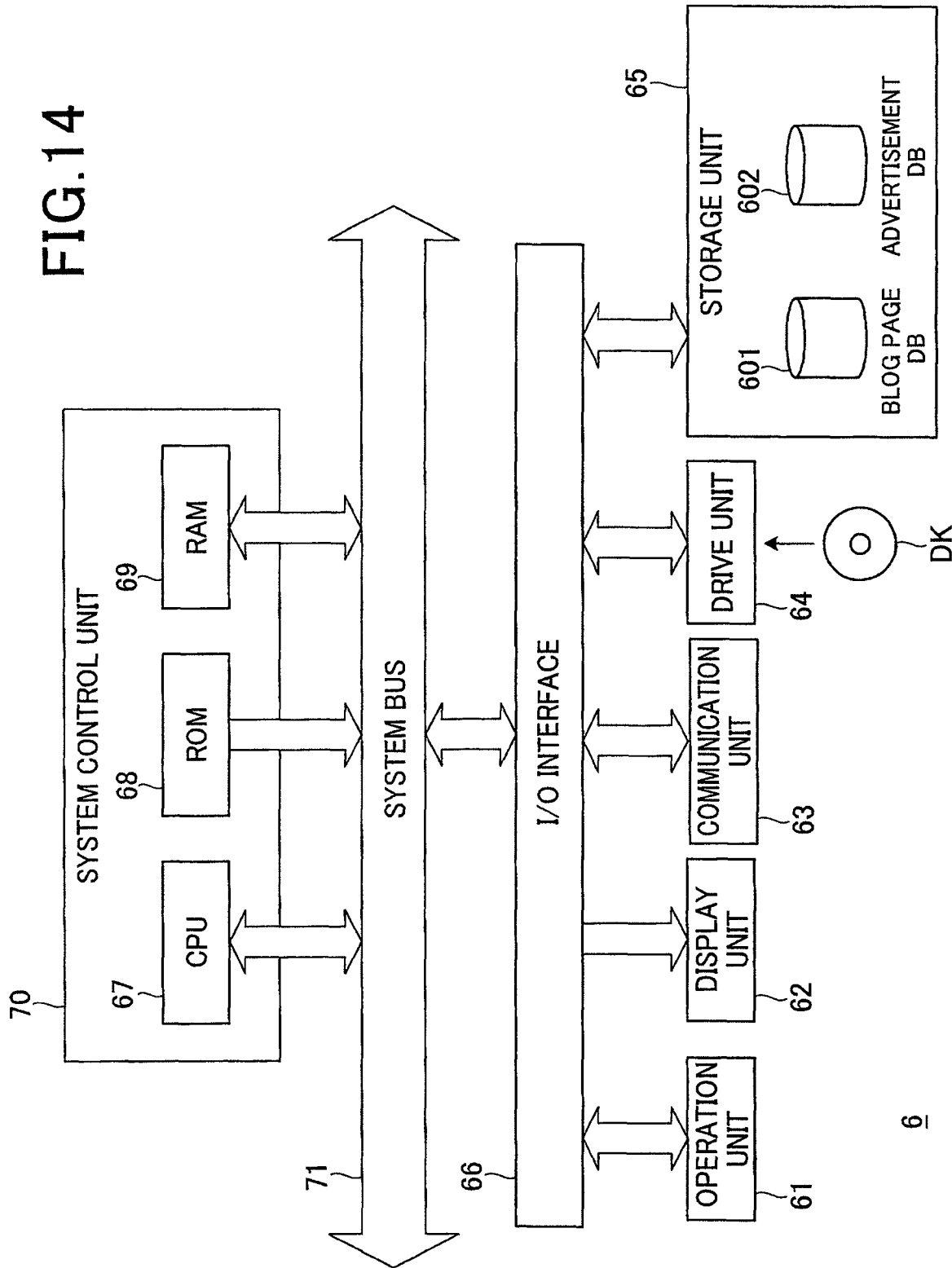
FIG. 14 is a block diagram showing an exemplary schematic structure of a blog server 6 according to one embodiment.
Figure 15:
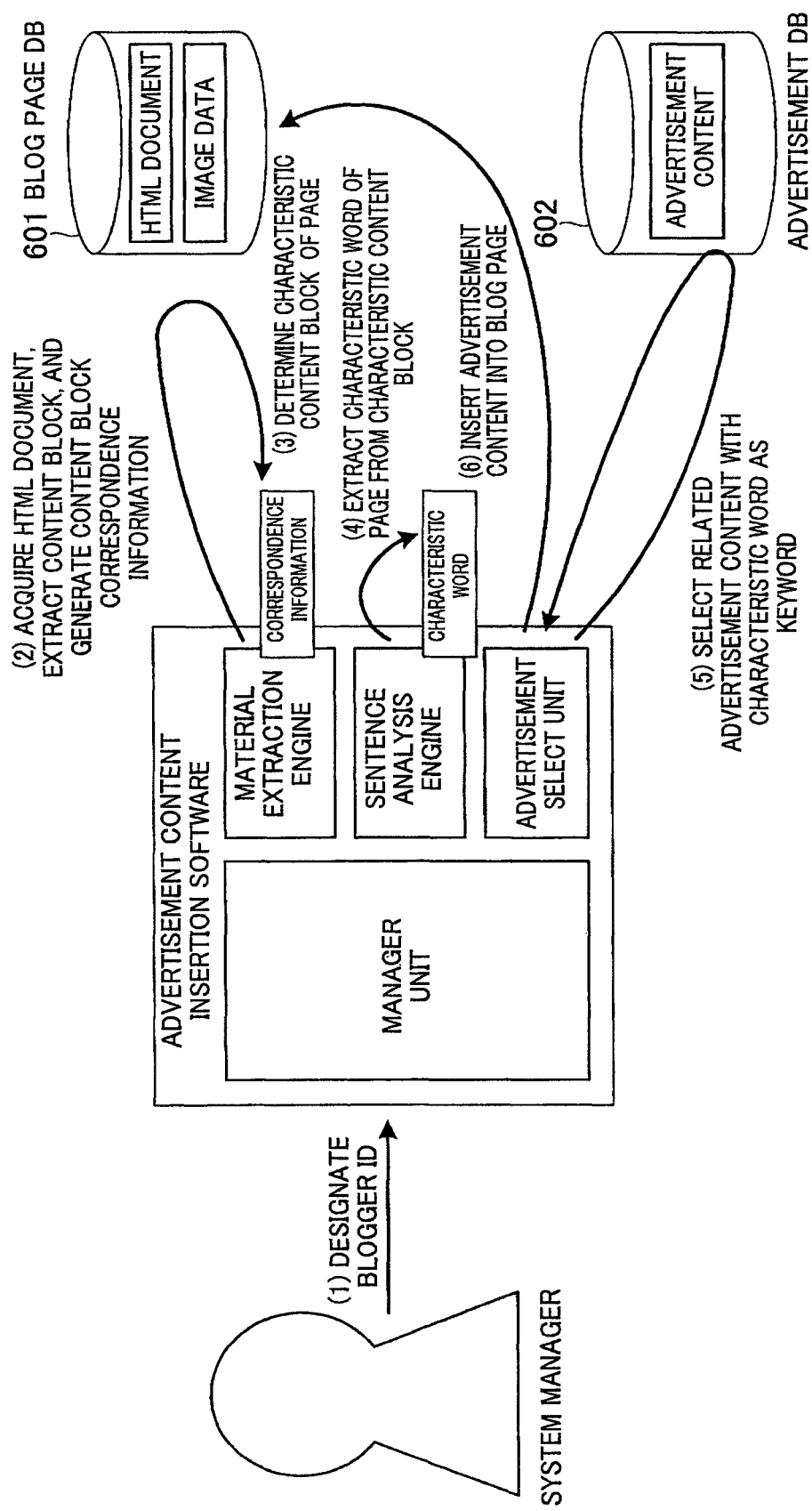
FIG. 15 is a diagram showing an outline of processings from designation of a blogger to insertion of an advertisement content into a blog page.
Figure 16:
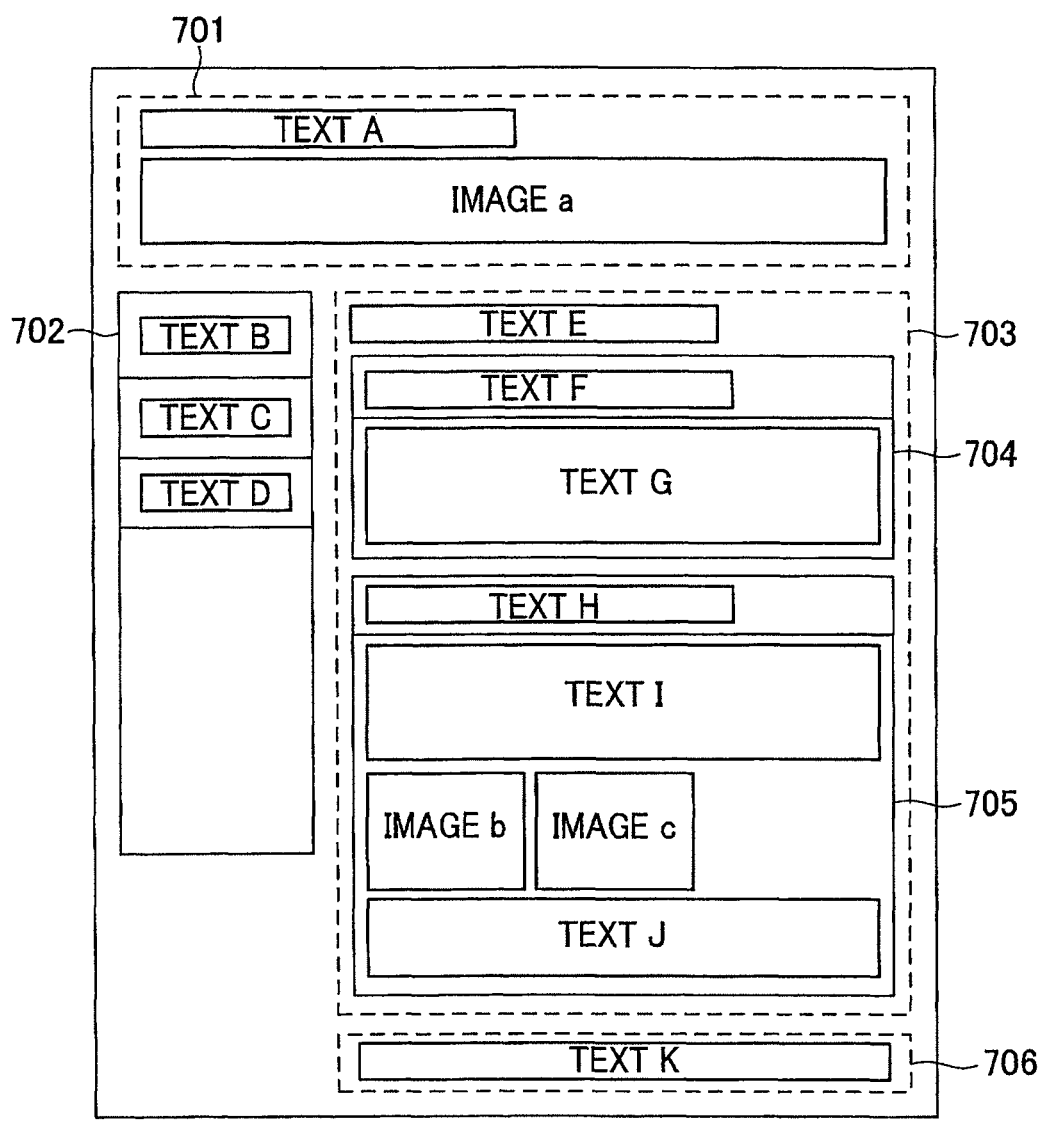
FIG. 16 is a diagram showing an exemplary structure of a Web page.
Figure 17:
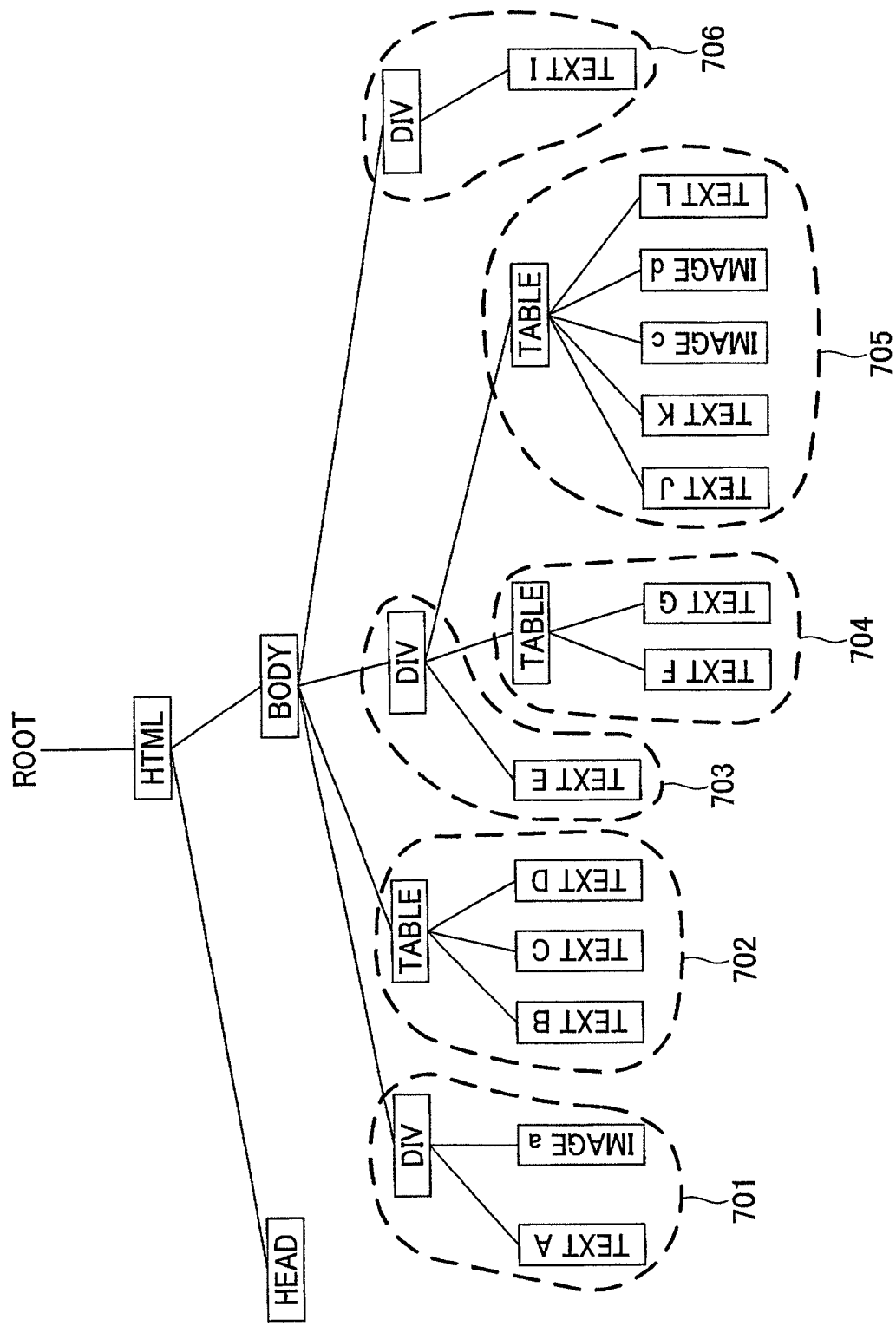
FIG. 17 is a diagram showing an exemplary DOM tree generated from HTML documents.
Figure 18:
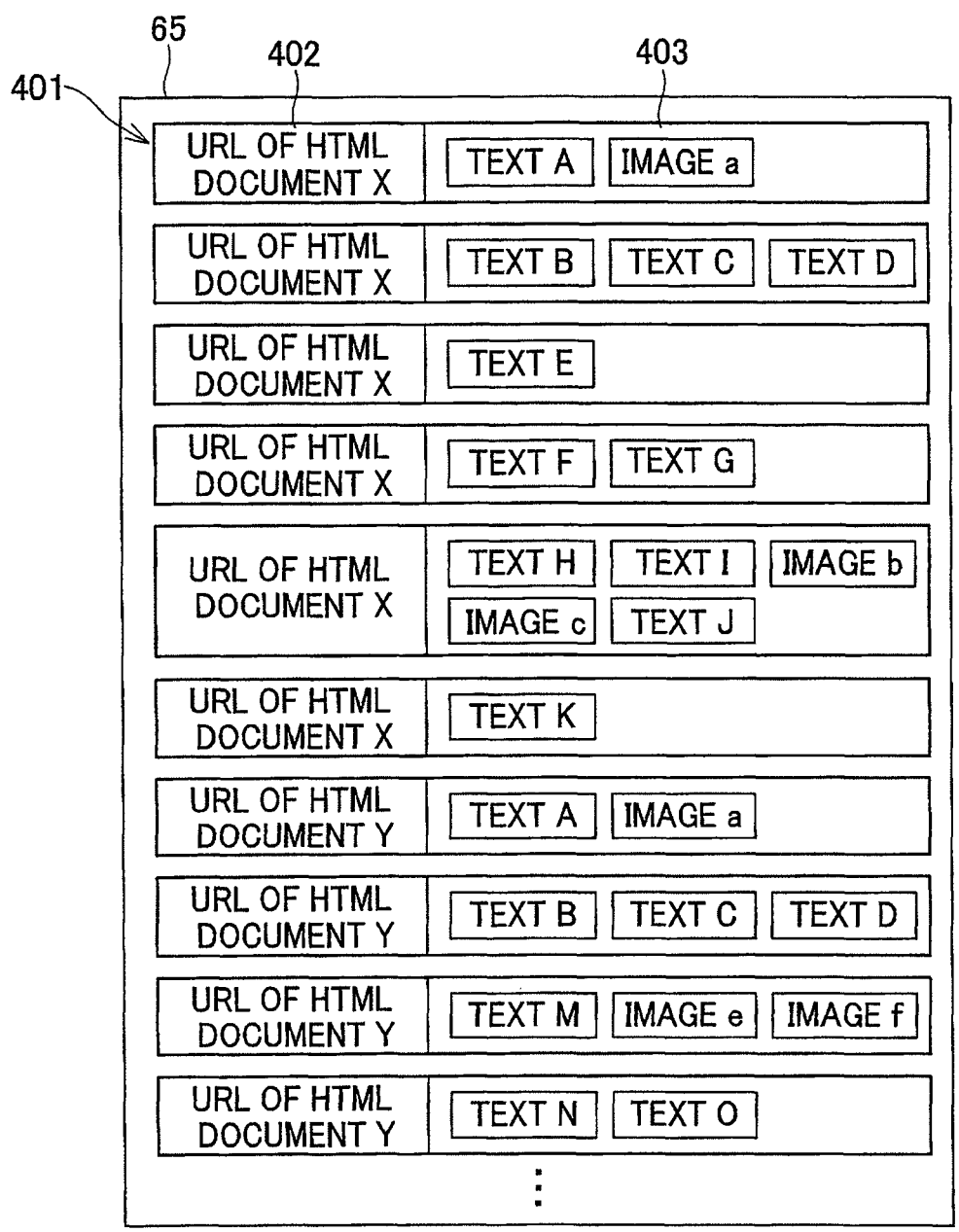
FIG. 18 is a diagram showing exemplary contents of content block correspondence information stored in a storage unit 65.

FIG. 14 is a block diagram showing an exemplary schematic structure of the blog server 6 according to the present embodiment. FIG. 15 is a diagram showing an outline of processings from designation of a blogger to insertion of an advertisement content into blog pages. FIG. 16 is a diagram showing an exemplary structure of a Web page. FIG. 17 is a diagram showing an exemplary DOM tree generated from HTML documents. FIG. 18 is a diagram showing exemplary contents of content block correspondence information stored in a storage unit 65.

As shown in FIG. 14, the blog server 6 comprises an operation unit 61, a display unit 62, a communication unit 63, a drive unit 64, the storage unit 65 as exemplary storage means, an I/O interface unit 66, and a system control unit 70. The system control unit 70 and the I/O interface unit 66 are connected to each other via a system bus 71.

The operation unit 61 is configured of a keyboard or a mouse, for example, and is directed for receiving an operation instruction from the system manager and outputting the instruction content as an instruction signal to the system control unit 70. The display unit 62 is configured of a CRT display or a liquid crystal display, for example, and is directed for displaying information such as characters and images. The communication unit 63 is connected to the network NW to control a communication state with the management terminal 3 and the user terminal 5. The drive unit 64 is directed for reading data from a disk DK such as flexible disk, CD or DVD and recording data in the disk DK.

The storage unit 65 is configured of a hard disk drive, for example, and is directed for storing various programs and items of data. The storage unit 65 constructs the blog page DB 601 and the advertisement DB 602 therein. The blog page DB 601 registers therein each blog page (such as HTML document in a blog page (exemplary document data) and image data as blog page's materials) constituting the blog service site in correspondence with the URL of the page and the user ID as blogger's identification information, for example. The advertisement DB 602 registers therein multiple advertisement contents in correspondence with keywords related to products or services to be advertised by the advertisement contents. When contents other than the text data are contained in the advertisement contents, the URLs of the contents are also registered in a correspondence manner. Since when the user selects an advertisement content displayed on the blog page, the site moves to a Web page related to the product or service to be advertised, the URL of the Web page is also registered in a correspondence manner.

The I/O interface unit 66 is configured to perform an interface processing between the operation unit 61 to the storage unit 65 and the system control unit 70. The system control unit 70 is configured of a CPU 67, a ROM 68, a RAM 69, and the like.

The CPU 67 reads and executes various programs stored in the ROM 68 or the storage unit 65 so that the system control unit 70 controls the respective units in the blog server 6. The system control unit 70 performs an advertisement content insertion software (exemplary characteristic content determination program) thereby to function as extraction means, calculation means, determination means and insertion means. The advertisement content insertion software or the like may be acquired from other server device via the network NW or may be recorded in the disc DK such as CD-ROM and read via the drive unit 64.

The advertisement content insertion software is a program for inserting advertisement contents into blog pages. As shown in FIG. 15, the advertisement content insertion software is configured of a manager unit, a material extraction engine, a sentence analysis engine, an advertisement select unit and the like. The manager unit controls the executions of the material extraction engine, the sentence analysis engine and the advertisement select unit. The material extraction engine is a software for extracting a content as Web material from HTML documents in a blog page and determining a characteristic content of the blog page. The contents are extracted in units of content block (exemplary content group). In the present embodiment, a blog article containing the characteristic contents of the article corresponds to a content block characteristic of the blog page.

The sentence analysis engine is a software for extracting characteristic words of the blog page from the blog article extracted as a characteristic content of the blog page. The advertisement select unit is a software for selecting an advertisement content related to the blog page with the extracted characteristic words as keywords.

An outline of the insertion of advertisement contents will be described below. As shown in FIG. 15, a user ID of a target blogger is designated by the system manager (1). The system control unit 70 acquires and analyzes the HTML documents in all the blog pages corresponding to the designated user ID from the blog page DB 601, and extracts contents as Web materials in units of content block. As the extraction result, content block correspondence information (exemplary content information) is generated per extracted content block (2). Then, the system control unit 70 calculates the frequency of appearance of each extracted content block in all the blog pages corresponding to the designated user ID. The frequency of appearance calculated in the present embodiment is the number of times of appearance (frequency), for example. The system control unit 70 determines a characteristic content block in each blog page based on the frequency of appearance.

Specifically, the system control unit 70 determines that a content block with the frequency of appearance equal to or less than a predetermined threshold in each blog page is characteristic of the blog page (3).

The system control unit 70 makes an analysis such as morphological analysis on the content block determined as characteristic, that is, on the blog article, thereby extracting characteristic words per block page (4). Various characteristic word extraction methods are present and well known, and thus a detailed explanation thereof will be omitted. By way of example, a word with the highest frequency of appearance is assumed as a characteristic word.

Then, the system control unit 70 refers to the advertisement DB 602 to select an advertisement content related to the extracted characteristic word (5). The system control unit 70 inserts a definition (such as tag, or description of data itself) for inserting and displaying the selected advertisement content into the blog pages into the HTML document in the blog pages (6).

A content block extraction method will be described below. In the present embodiment, it is assumed that text data and image data are extracted as Web materials.

For example, a structure (layout) of the blog page is assumed as shown in FIG. 16. Each content as Web material is displayed per block on the blog page. Each block corresponds to a content block. Each content is divided into content blocks by DIV tags and TABLE tags (exemplary predefined tags) described in the HTML documents. That is, each content is blocked (grouped) by the DIV tag and the TABLE tag.

FIG. 16 displays content blocks 701 to 706. The content block 701 is a content block of a header part of the page, for example, and is configured of a text A and an image a. The content block 702 is a content block of a navigation part for moving to other Web pages, for example, and is configured of a text B, a text C and a Text D indicating the links to other Web pages, for example. The content block 703 corresponds to a blog display area, for example, and is configured of a text E indicating the title of the blog and the like, the content block 704 and the content block 705. In this way, the content blocks may be nested, that is, in a hierarchy structure. In this case, it is assumed that the content contained in the content block 703 is only the text E, and that the content block 704 and the content block 705 are independent from the content block 703. The content blocks 704 and 705 are each one blog article. The content block 704 is configured of texts F and G indicating the title or text of the blog article. The content block 705 is configured of texts H, I and J indicating the title or text of the blog article, and images b and c registered by the blogger in association with the blog article. The content block 706 is a content block indicating a copyright display, for example, and is configured of the text I.

The content blocks 701, 702, 703 and 706 among the content blocks are relatively frequently appear on blog pages other than the blog page shown in FIG. 16. On the other hand, the content block 704 and the content block 705 are basically used only for the blog page. Thus, the content block 704 or the content block 705 is determined as characteristic of the blog page.

In the present embodiment, the content blocks corresponding to the blog article containing the characteristic contents of the article need to be determined as characteristic. Some blog articles containing the characteristic contents may be contained in one page. Thus, the content blocks with the frequency of appearance equal to or less than the predetermined threshold are all assumed as characteristic content blocks. For example, a value of the threshold is set at 1. The blog article containing the characteristic contents is determined as characteristic content block, and the blog article containing only similar contents to those of other blog articles is not determined as characteristic content block. The frequencies of appearance of the content blocks such as header part, navigation part and copyright display part common in the respective pages are twice or more, respectively, and thus they are not determined as characteristic content blocks. The threshold is previously stored in the storage unit 65.

FIG. 17 represents the HTML documents in the blog page shown in FIG. 16 in the DOM tree, that is, in a tree structure. Nodes of the tags not necessary for the explanation of the present embodiment will be omitted from the DOM tree shown in FIG. 17.

When extracting a content block similarly as in the first embodiment, the system control unit 70 temporarily stores content block correspondence information indicating the extraction result in the storage unit 65. As shown in FIG. 18, the content block correspondence information (numeral 401) is stored per content block. In the present embodiment, a characteristic word is extracted from a content block determined as characteristic of the blog page, that is, from the blog article, and thus only text data may be extracted and image data may not be extracted.

[2-3. Operations of Blog System]

The operations of the blog system BS will be described below with reference to FIGS. 19 to 21.

Figure 19:
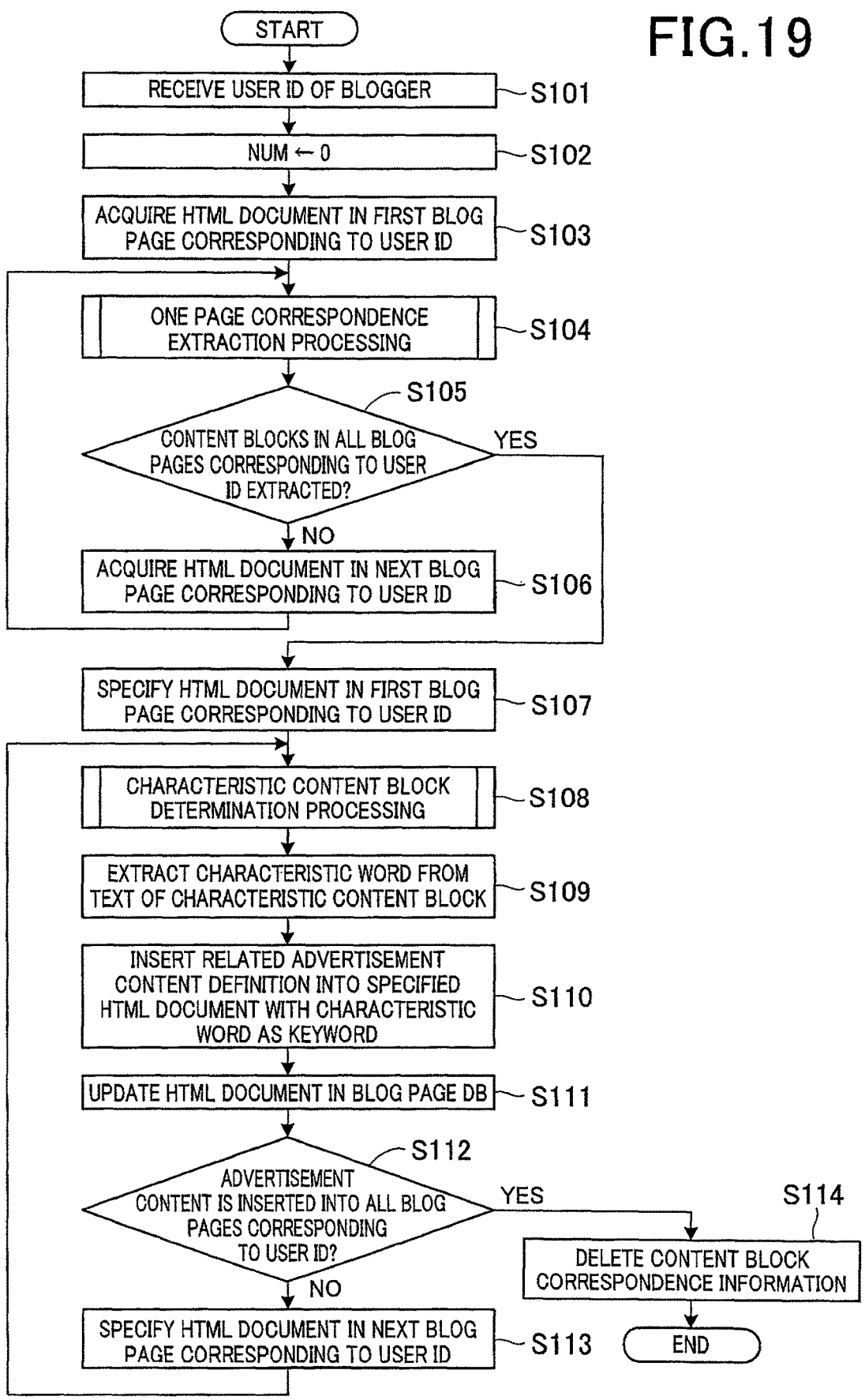
FIG. 19 is a flowchart showing exemplary processings in an advertisement content insertion processing by a system control unit 70 in the blog server 6 according to one embodiment.

FIG. 19 is a flowchart showing exemplary processings in an advertisement content insertion processing by the system control unit 70 in the blog server 6 according to the present embodiment.

The advertisement content insertion processing is started when a request for executing the advertisement content insertion processing is transmitted from the management terminal 3 based on a system manager's operation, for example.

When the system manager designates the user ID of the blogger managing the blog into which an advertisement content is to be inserted, the system control unit 70 receives the designated user ID from the management terminal 3 as shown in FIG. 19 (step S101).

The system control unit 70 sets the number of blocks NUM at 0 (step S102). The number of blocks NUM is the number of content blocks found at this point of time. NUM is a global variable, and can be accessed by a page correspondence extraction processing and a tree search processing described later.

Then, the system control unit 70 acquires a HTML document in the first blog page corresponding to the received user ID from the blog page DB 601 (step S103). The system, control unit 70 designates the acquired HTML document and executes the page correspondence extraction processing described later (step S104). In the page correspondence extraction processing, a content block is extracted from the acquired HTML document and content block correspondence information is stored.

Then, the system control unit 70 determines whether the content blocks in all the blog pages corresponding to the received user ID have been extracted (step 105). At this time, when a blog page for which a content block has not been extracted is present (step S105: NO), the system control unit 70 acquires HTML documents in a next blog page from the blog page DB 601 (step S106) and proceeds to step S104. The system control unit 70 repeats the processings in steps S104 to 106 to extract the content blocks in all the blog pages (step S105: YES), and then proceeds to step S107.

In step S107, the system control unit 70 specifies the HTML document in the first blog page corresponding to the received user ID.

The system control unit 70 designates the acquired HTML document and executes the characteristic content block determination processing described later (step S108). In the characteristic content block determination processing, a content block is extracted from the specified HTML document and a content block characteristic of the blog page is determined.

The system control unit 70 extracts a characteristic word of the blog page from each item of text data constituting the content block determined as characteristic (step S109). The system control unit 70 inserts an advertisement page related to the blog page into the blog page based on the extracted characteristic word (step S110). Specifically, the system control unit 70 refers to the advertisement DB 602 and selects an advertisement content corresponding to a keyword with the extracted characteristic word as the keyword. The system control unit 70 inserts a definition of the selected advertisement content at a predetermined position in the specified HTML document. For example, when text data is contained in the advertisement content, the system control unit 70 adds the contents of the text data to the HTML document. For example, when image data is contained in the advertisement content, the system control unit 70 adds the IMG tag for displaying the image data to the HTML document. For example, the system control unit 70 adds link information to Web pages related to a product or service to be advertised to the HTML document.

When inserting the definition of the advertisement content into the specified HTML document, the system control unit 70 updates the HTML document registered in the blog page DB 601 by the HTML document (step S111).

Then, the system control unit 70 determines whether the advertisement content has been inserted into all the blog pages corresponding to the received user ID (step S112). When a blog page into which the advertisement content has not been inserted is present (step S112: NO), the system control unit 70 specifies a HTML document in a next blog page (step S113) and proceeds to step S108. When repeating the processings in steps S108 to S113 and inserting the advertisement content into all the blog pages (step S112: YES), the system control unit 70 deletes all the content block correspondence information stored in the storage unit 65 from the storage unit 65 (step S114). When terminating the processing, the system control unit 70 terminates the advertisement content insertion processing.

Figure 20:
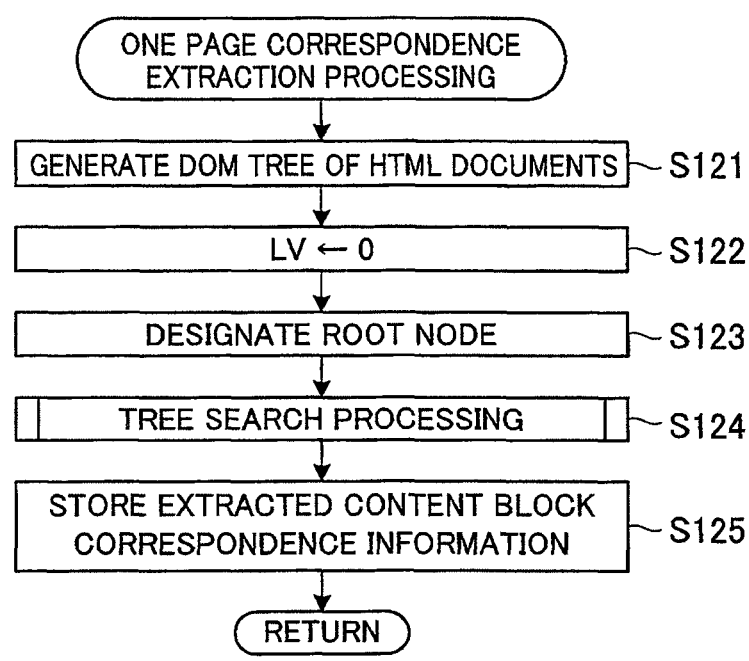
FIG. 20 is a flowchart showing exemplary processings in a page correspondence extraction processing by the system control unit 70 in the blog server 6 according to one embodiment.

FIG. 20 is a flowchart showing exemplary processings in the page correspondence extraction processing by the system control unit 70 in the blog server 6 according to the present embodiment.

As shown in FIG. 20, the system control unit 70 first generates a DOM tree of the acquired HTML documents on the RAM 69 (step S121).

The system control unit 70 sets the hierarchy LV at 0 (step S122). The hierarchy LV is a hierarchy level of the content block to which a currently-searched node belongs in the DOM tree. LV is a global variable and can be accessed from the page correspondence extraction processing and the tree search processing.

The system control unit 70 designates a root node of the DOM tree (step S123) and executes the tree search processing (step S124). The processing contents of the tree search processing are the same as those of the first embodiment and thus a detailed explanation thereof will be omitted.

The system control unit 70 stores each item of content block correspondence information generated by the tree search processing in the storage unit 65 (step S125). When terminating the processing, the system control unit 70 terminates the page correspondence extraction processing.

Figure 21:
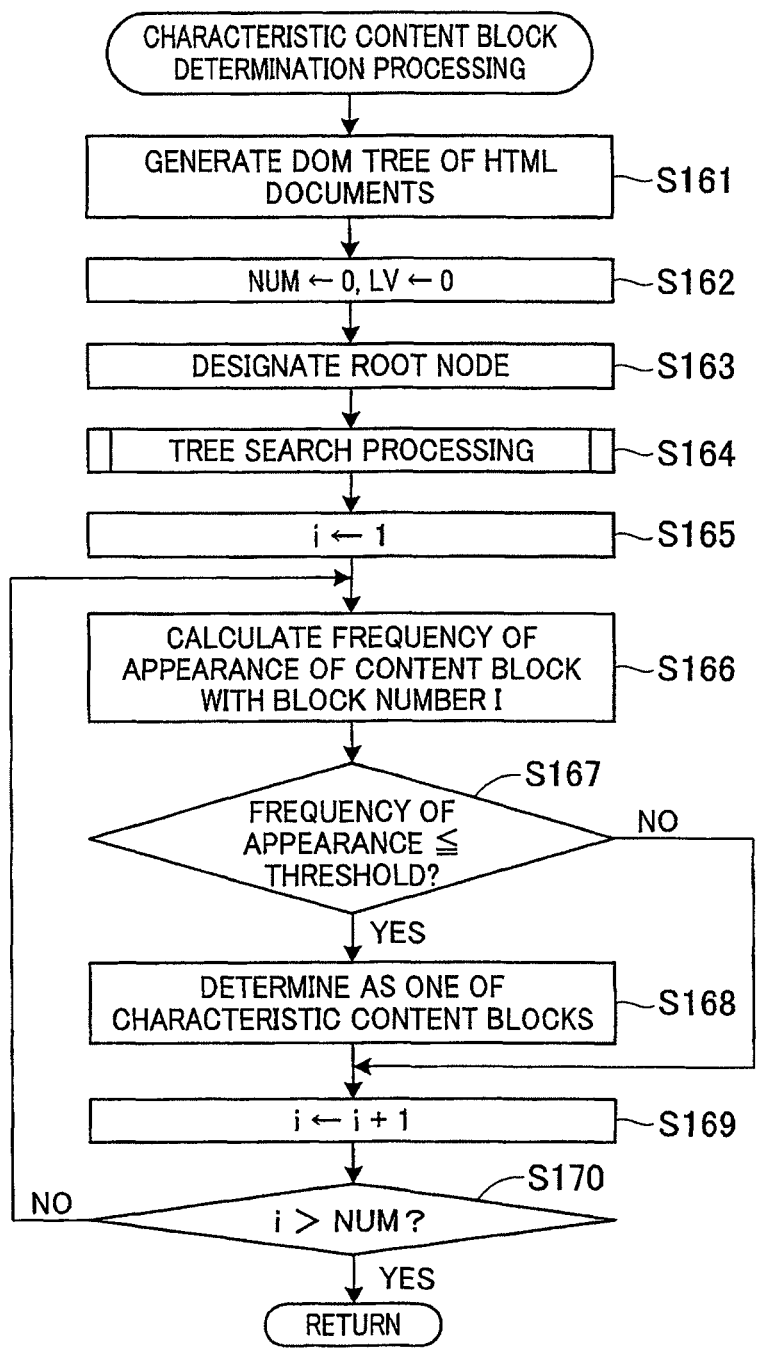
FIG. 21 is a flowchart showing exemplary processings in a characteristic content block determination processing by the system control unit 70 in the blog server 6 according to one embodiment.

FIG. 21 is a flowchart showing exemplary processings in the characteristic content block determination processing by the system control unit 70 in the blog server 6 according to the present embodiment.

As shown in FIG. 21, the system control unit 70 first generates a DOM tree of the designated HTML documents (step S161), sets the number of blocks NUM and the hierarchy LV at 0 (step S162), designates a root node of the DOM tree (step S163), and executes the tree search processing (step S164), similarly as in the page correspondence extraction processing.

The system control unit 70 sets the block number i at 1 (step S165). The system control unit 70 calculates the frequency of appearance of the content block with the block number i (step S166).

Specifically, the system control unit 70 compares block configuration information of content block correspondence information i generated in the tree search processing in step S164 with block configuration information of each item of content block correspondence information stored in the storage unit 65, and thereby calculates the frequency of appearance. The appearance frequency calculation method is the same as that of the first embodiment.

When calculating the frequency of appearance, the system control unit 70 determines whether the calculated frequency of appearance is equal to or less than the threshold stored in the storage unit 65 (step S167). At this time, when the frequency of appearance is the threshold or less (step S167: YES), the system control unit 70 determines the content block with the block number i as characteristic (step S168). That is, the system control unit 70 adds the content block with the block number i to the content blocks characteristic of the blog page to which the designated HTML documents correspond.

When the frequency of appearance is more than the threshold (step S167: NO) or when the processing in step S168 is terminated, the system control unit 70 adds 1 to the block number i (step S169) and determines whether the block number i is more than the value of the number of blocks NUM (step S170). At this time, when the block number i is the value of the number of blocks NUM or less (step S170: NO), the system control unit 70 proceeds to step S166. When calculating the frequencies of appearance of all the content blocks extracted in the tree search processing (step S170: YES), the system control unit 70 terminates the characteristic content block determination processing.

The system control unit 70 extracts the content blocks by the tree search processing in step S164, but the content blocks in all the blog pages corresponding to the received user ID of the blogger are extracted in the page correspondence extraction processing (step S104 in FIG. 19) executed from the advertisement content insertion processing and consequently the content block correspondence information is stored in the storage unit 65, and thus the content blocks does not need to be extracted again. In this case, the content block correspondence information of each content block constituting the blog page to which the HTML document corresponds can be acquired from the storage unit 65 based on the URL of the designated HTML document.

[2-4. First Variant]

A variant of the present embodiment will be described below with reference to FIG. 22.

The configuration in the above explanation is that when the system manager designates a blogger, an advertisement content is inserted into the blog pages of the designated blogger, but an advertisement content may be inserted at a blog update timing.

Figure 22:
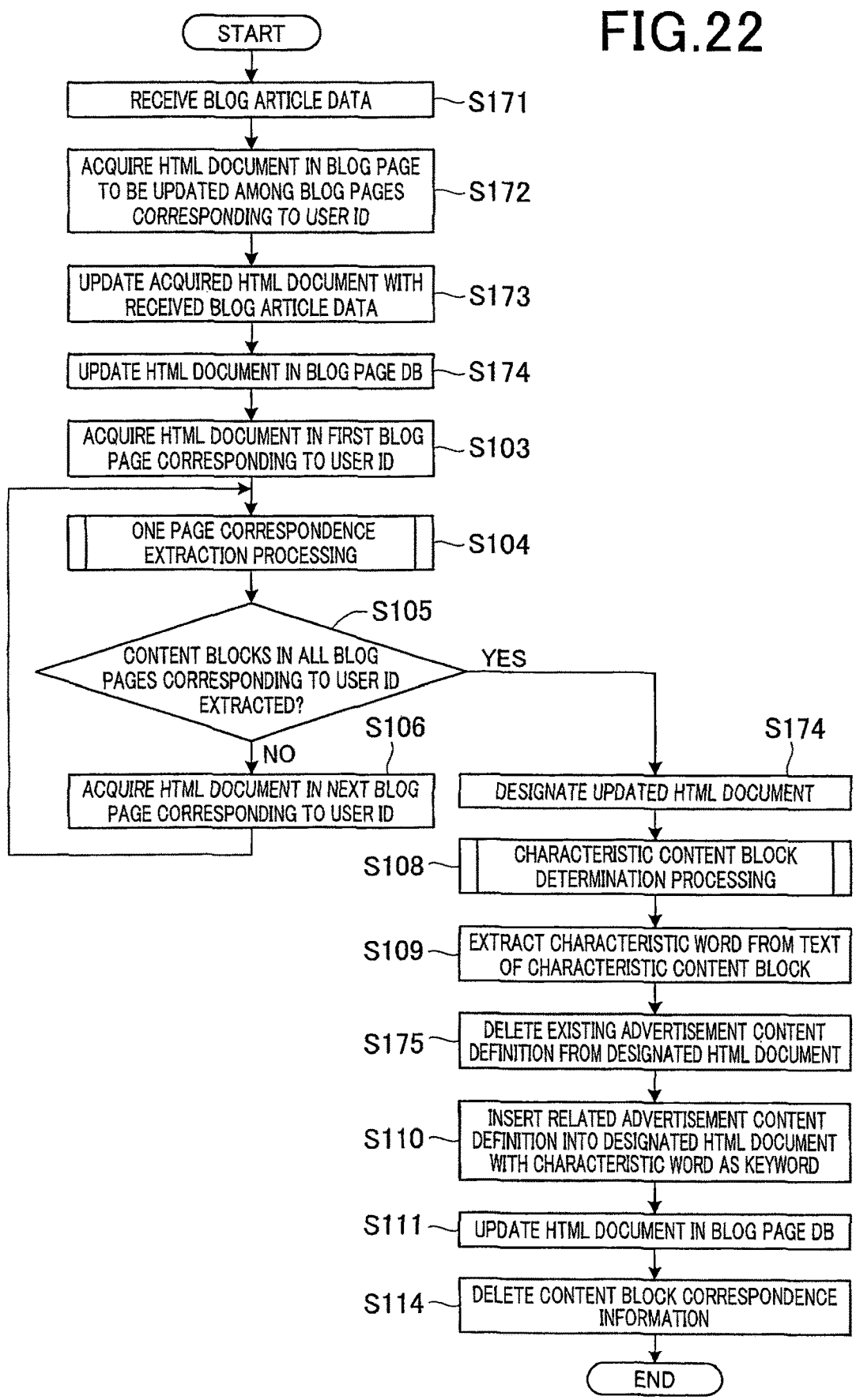
FIG. 22 is a flowchart showing exemplary processings during blog update processing by the system control unit 70 in the blog server 6 according to a variant of one embodiment.

FIG. 22 is a flowchart showing exemplary processings during blog update by the system control unit 70 in the blog server 6 according to the variant of the present embodiment. In FIG. 22, like step numerals are denoted to similar processings to those of FIG. 19.

At first, the blogger operates the user terminal 5 to access the blog service site, and inputs his/her user ID and password to log in the blog service site prior to updating the blog. In response to the log-in, the blog server 6 issues a session ID to the user terminal 5 and manages the session ID and the user ID in a correspondence manner. Since a request from the user terminal 5 to the blog server 6 includes the session ID, the blog server 6 can specify from which user the request has come.

When the blogger registers a new blog article, the user terminal 5 transmits data on the blog article (such as text data of title or text, and image data) to the blog server 6, and the system control unit 70 in the blog server 6 receives the data on the blog article (step S171) as shown in FIG. 22. The system control unit 70 acquires the HTML document in the blog page to be updated among the blog pages corresponding to the user ID of the blogger from the blog page DB 601 (step S172). The system control unit 70 updates the acquired HTML document based on the received data on the blog article (step S173). For example, the system control unit 70 adds the TABLE tag or the DIV tag for the blog article to the acquired HTML document, and adds the received text data on the title or text of the blog article between the tags. The system control unit 70 updates the HTML document registered in the blog page DB 601 by the HTML document added with the data on the blog article (step S174).

The system control unit 70 extracts the content blocks from all the blog pages corresponding to the user ID of the blogger (steps S103 to S106).

The system control unit 70 designates the HTML document updated in step S173, executes the characteristic content block determination processing (step S108), and extracts a characteristic word of the blog page from each item of text data constituting the content block determined as characteristic (step S109).

The system control unit 70 deletes the definitions of the existing advertisement contents from the designated HTML document (step S775), and inserts the definition of the related advertisement content with the extracted characteristic word as keyword (step S110). That is, the system control unit 70 changes the advertisement contents to be displayed on the blog pages.

The system control unit 70 updates the HTML document registered in the blog page DB 601 by the HTML document into which the definition of the advertisement content is inserted (step S111), and deletes all the content block correspondence information from the storage unit 65 (step S114).

The processings when a blog page has to be newly generated along with the update of the blog may be basically similar to the above processings. Since an advertisement content is not inserted into the newly-generated blog page, the definition of the advertisement content is not deleted in step S175.

[2-5. Second Variant]

The threshold used for determining the characteristic content of the blog page is set at 1 in the above explanation, the threshold may be set at 2 or more.

For example, when the threshold is set at 1, a content block (blog article) with the frequency of appearance of 1 is extracted as a characteristic content of the blog page, and a characteristic word is extracted from text data on the extracted blog article. When the amount of text data of each extracted blog article is less, a smaller number of words are to be extracted. When a sufficient number of words cannot be extracted, a characteristic word may not be determined at all or may not be accurately determined. Thus, the threshold is made larger and a condition under which a content is determined as characteristic of the blog page is relaxed, thereby increasing the blog articles for which the characteristic words are to be extracted. Thereby, the characteristic words can be extracted.

Specifically, the system control unit 70 in the blog server 6 first sets the threshold at 1 and determines a content block characteristic of the blog page thereby to extract the blog article with the frequency of appearance of 1 and to extract characteristic words. When determining that a characteristic word cannot be extracted, the system control unit 70 changes the threshold to 2 thereby to extract blog articles and to extract characteristic words. When still determining that a characteristic word cannot be extracted, the system control unit 70 changes the threshold to 3 to extract blog articles and to extract characteristic words. The system control unit 70 continues the processings until a characteristic word can be extracted. That is, when the processings cannot be normally performed based on the characteristic content block extraction result, the threshold is increased.

If the threshold is unlimitedly increased, contents other than the blog articles are extracted, and thus the processing is interrupted when the threshold reaches a certain value. For example, when the threshold reaches the value of the number of blog pages corresponding to the designated blogger, the content blocks commonly used for each blog page are extracted and thus the processing may be interrupted when the threshold reaches the value of the number of blog pages.

For example, the system manager may previously determine that the content block appearing once per predetermined blog pages is characteristic of the blog pages. In this case, the number of times of appearance as the threshold may be changed in proportion to the number of blog pages corresponding to the designated blogger.

[2-6. Third Variant]

The number of times of appearance (frequency) is used as the frequency of appearance used for determining a characteristic content of a blog page in the above explanation, but a rate of the number of times of appearance relative to all the content blocks in the blog pages corresponding to the designated blogger (relative frequency) may be used.

For example, other users can register comments for the blog articles registered by the blogger, and the comments can be browsed together with the blog articles. Text data on the comments is one content constituting the blog page. When adding the text data on the comments to the blog page, the system control unit 70 in the blog server 6 adds the description of the blocking tag to the HTML document in the blog page and then adds the text data, and thus assumes the text data on the comments as an independent content block from the text data on the blog articles or other comments. The system control unit 70 extracts the text data on the comments as a content block, and when the extracted text data on the comments has characteristic contents, inserts advertisement contents related to the comments into the blog pages.

When multiple comments are registered for a blog article, each content of the comments may be a frequently appearing content or not-frequently appearing content, such as a majority opinion or a minority opinion. The majority opinion is a typical opinion and is considered as uncharacteristic. On the other hand, the minority opinion is a peculiar opinion and can be considered as characteristic of the blog page. In this case, the comments indicating the minority opinion are desired to extract as a characteristic content of the blog page.

However, the number of majority opinions and the number of minority opinions are relative and change with the total number of comments. In this case, when the frequency is used as the frequency of appearance and the threshold is set at 1, for example, the not-frequently appearing contents (minority opinions) may not be accurately extracted. Thus, the relative frequency is used as the frequency of appearance and the threshold is set at a predetermined rate. The threshold can be arbitrarily set at this time. For example, when the contents of the extracted content block can be divided into N patterns (N is an integer of 2 or more), the threshold may be set at 1/N or less for discriminating the minority opinions. In this way, the system control unit 70 may change the threshold depending on a situation.

A system capable of registering comments on articles such as blogs is Twitter (trademark) in which a user registers tweets and other users can register following tweets, or bulletin board, for example.

As described above, according to the present embodiment, the system control unit 70 in the blog server 6 extracts a content constituting a blog page sequentially designated by designating a HTML document, and calculates the frequency of appearance of each content constituting the designated blog page, and determines that a content with the frequency of appearance having a predetermined threshold or less among the contents constituting the designated blog page is characteristic of the blog page.

Therefore, since a content with a lower frequency of appearance rarely appears on blog pages other than the designated blog page, a determination is made as to whether the frequency of appearance is the threshold or less, so that all the contents meeting the condition are specified as characteristic of the designated blog page. Thus, the characteristic contents of the blog page can be easily extracted.

The system control unit 70 in the blog server 6 inserts an advertisement content related to the characteristic contents of the designated blog page into the blog page.

The information related to the characteristics of the blog page can be added to the Web page.

When text data on a blog article is contained as a content constituting a designated blog page, the system control unit 70 in the blog server 6 determines that the text data is a characteristic content of the blog page, and extracts a characteristic word of the blog page from the text data on the blog article, and inserts a previously-related advertisement content into the blog page with the characteristic word as keyword.

Thus, an advertisement related to the contents of the blog posted on the blog page can be added to the blog page.

The system control unit 70 in the blog server 6 calculates the frequency of appearance of each content on the blog pages contained in the blog service site.

Since the frequency of appearance of each content constituting the designated blog page is calculated on multiple Web pages contained in the blog service site (such as multiple blog pages corresponding to the user ID of the designated blogger), the content commonly used within the blog service site can be determined as not-characteristic, thereby enhancing the determination accuracy.

The system control unit 70 in the blog server 6 extracts contents constituting a blog page in units of content block constituted of one or more contents, calculates the frequency of appearance of each content block constituting the designated blog page, and determines that a content block with the frequency of appearance having the threshold or less among the content blocks constituting the designated blog page is characteristic of the blog page.

When one or more contents are displayed together as a content block such as header part, navigation part, blog display part and copyright part in the blog page, a content block characteristic of the blog page can be extracted.

The system control unit 70 in the blog server 6 extracts a content constituting the blog page based on the HTML document in the blog page, and defines a content block based on the DIV tag or the TABLE tag in the HTML document.

Thus, since one or more contents clearly blocked in creating the HTML document can be specified by the DIV tag and one or more blocked contents displayed in a table can be specified by the TABLE tag, an accuracy of determining a characteristic content of the Web page can be enhanced by the tags when the characteristic contents of the blog page and the not-characteristic contents are blocked together, for example.

In the second embodiment, the content block correspondence information corresponding to each content block constituting the designated blog page is compared with each item of content block correspondence information constituting all the blog pages corresponding to the user ID of the designated blogger, thereby calculating each frequency of appearance. That is, when the frequency of appearance of each content block constituting the designated blog page is calculated, the frequency of appearance in a target range for all the blog pages corresponding to the designated blogger is calculated, but the target range is not limited thereto. For example, a predetermined number of blog pages may be targeted or all the blog pages constituting the blog service site may be targeted.

In the second embodiment, an advertisement content indicating an advertisement related to a product or service is inserted into a Web page as a content related to the characteristic content of the Web page, but any related contents may be inserted, not limited to the advertisement content. For example, image data (such as still image or animation image) related to a content such as blog article determined as characteristic content may be inserted as a background image or inserted image (such as illustration). Specifically, an image data database is constructed and image data and keywords are registered in the database in a correspondence manner. A keyword associated with image data is a word indicating an image displayed by the image data or a word related to the image. A characteristic word is extracted from a content determined as characteristic, and related image data is selected from the database with the extracted characteristic word as keyword. The URL of the selected image data is inserted as background attribute into the BODY tag of the target HTML document or the IMG tag indicating the selected image data is inserted at a predetermined position in the target HTML document. Thereby, an image suitable for the content such as blog article determined as characteristic can be inserted into a Web page.

The application of the characteristic content of the Web page is not limited to the insertion of the related content into the Web page. For example, a new content may be generated based on the characteristic content of the Web page.

3. Third Embodiment

A third embodiment of the present invention will be described below. The present embodiment can be applied to any of the content generation server 1 in the first embodiment and the blog server 6 in the second embodiment. For convenience, a case in which the third embodiment is applied to the content generation server 1 will be described below.

In the present embodiment, the system control unit 20 of the content generation server 1 calculates a frequency of appearance of each content constituting a designated product detail page in the designated product detail page. This frequency of appearance is a "first frequency of appearance." In addition, the system control unit 20 calculates a frequency of appearance of each content constituting a designated product detail page in other product detail pages. This frequency of appearance is a "second frequency of appearance." The system control unit 20 then determines a characteristic content of the designated product detail page among contents constituting the designated product detail page based on the calculated first frequency of appearance and the calculated second frequency of appearance.

For example, the system control unit 20 calculates for each content a ratio of the first frequency of appearance to the second frequency of appearance. This ratio is an "appearance frequency ratio." For example, the system control unit 20 may determine that a content with the highest appearance frequency ratio among the contents constituting the designated product detail page is a characteristic content. Alternatively, the system control unit 20 may determine that at least one content with an appearance frequency ratio having predetermined value or more among the contents constituting the designated product detail page is a characteristic content, for example. Accordingly, the higher a first frequency of appearance of a content as compared with a second frequency of appearance is, the higher the probability that the content will be determined as a characteristic content of the designated product detail page is.

The system control unit 20 may calculate, as the second frequency of appearance, a frequency of appearance of a content in all of the product detail pages other than the designated product detail page. Alternatively, the system control unit 20 may identify, for example, product detail pages which each include at least one content which is the same as that included in the designated product detail page, among all of the product detail pages other than the designated product detail page. Then, the system control unit 20 may calculate, as the second frequency of appearance, a frequency of appearance of each content constituting the designated product detail page in the identified product detail pages, for example. The system control unit 20 can appropriately determine a characteristic content since the first frequency of appearance in the designated product detail page is compared to the second frequency of appearance in the product detail pages, each of which includes the same content as that included in the designated product detail page. At this time, the system control unit 20 may identify, for example, product detail pages each including relatively more contents which are the same as those included in the designated product detail page. For example, the system control unit 20 calculates the number of the contents, among contents included in each product detail page, which are the same as those included in the designated product detail page. Then, the system control unit 20 may identify a predetermined number of product detail pages in descending order of the calculated numbers.

Figure 23:
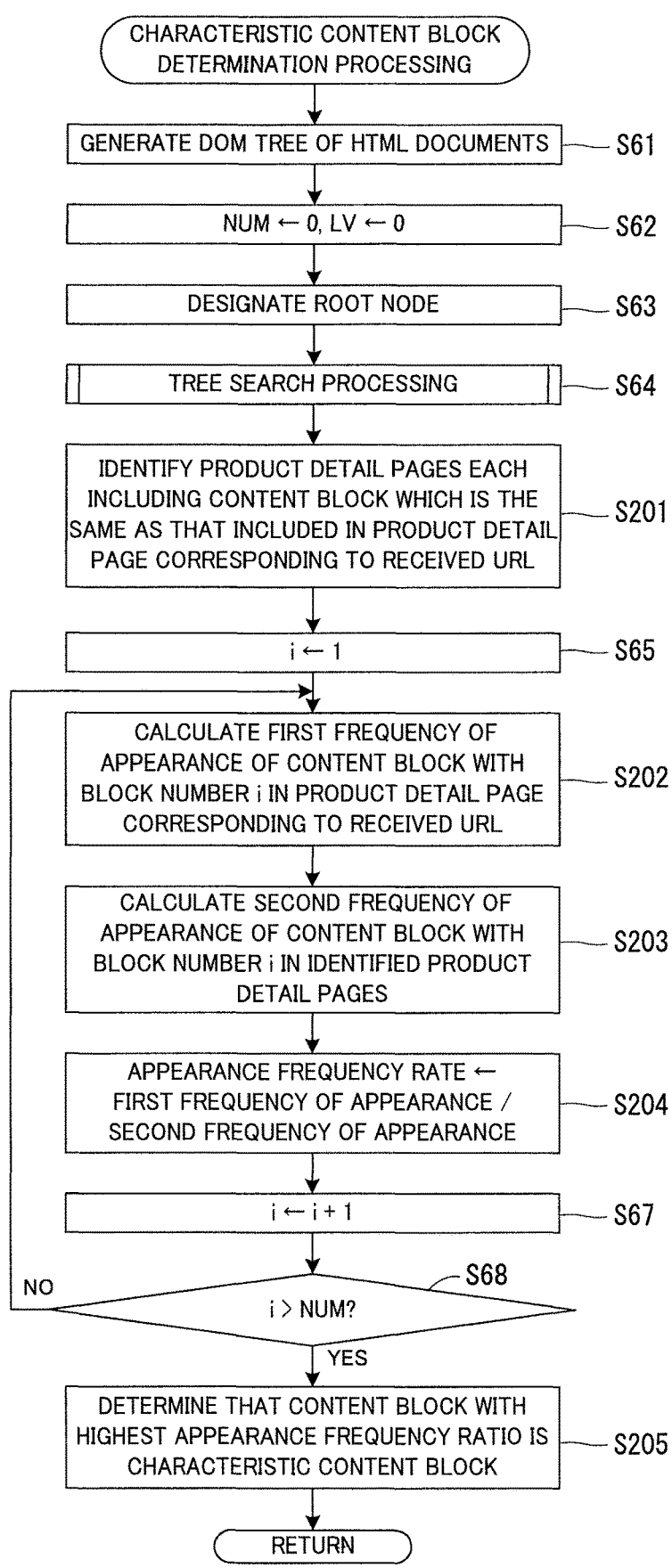
FIG. 23 is a flowchart showing exemplary processings in a characteristic content block determination processing by the system control unit 20 in the content generation server 1 according to one embodiment.

FIG. 23 is a flowchart showing exemplary processings in a characteristic content block determination processing by the system control unit 20 in the content generation server 1 according to the present embodiment. In FIG. 23, the same processes as those in FIG. 11 are denoted by the same reference numerals.

As show in FIG. 23, the system control unit 20 executes steps S61 to S64. Then, the system control unit 20 identifies product detail pages which each include at least one content block which is the same as at least one of content blocks included in the product detail page corresponding to the URL received in step S51 of the content generation processing (step S201). Specifically, the system control unit 20 acquires pieces of content block correspondence information corresponding the received URL from the material extraction DB 101. Then, the system control unit 20 acquires pieces of block configuration information from the acquired pieces of content block correspondence information and generates a first content list including the acquired pieces of block configuration information. Then, the system control unit initializes a URL list. A URL which will be registered in the URL list indicates product detail page including at least one content block which is the same as at least one of content blocks included in the product detail page corresponding to the received URL. Then, the system control unit 20 sets a number j at 1. Then, the system control unit 20 acquires a j-th piece of block configuration information from the first content list. Then, the system control unit 20 retrieves content block correspondence information including block configuration information which is the same as the j-th piece of block configuration information from the material extraction DB 101. Then, the system control unit 20 registers one or more URLs included in the retrieved content block correspondence information in the URL list. At this time, the system control unit 20 does not register a URL which is the same as the received URL. In addition, the system control unit 20 does not register again a URL which is the same as a URL which has already registered in the URL list. Then, the system control unit 20 adds 1 to the number j when the number j is smaller than the number of pieces of block configuration information registered in the first content list. Then, the system control unit 20 performs retrieval of content block correspondence information including block configuration information which is same as a j-th piece of block configuration information and registration of URLs in the same manner as described above. On the other hand, when the number j is the same as the number of pieces of block configuration information registered in the first content list, the system control unit 20 acquires all pieces of content block correspondence information corresponding to each URL registered in the URL list. Then, the system control unit 20 acquires content configuration information from each of the acquired pieces of content block correspondence information. Then, the system control unit 20 generates a second content list including the acquired pieces of content configuration information. Then, the system control unit 20 sets the block number i at 1 (step S65).

Then, the system control unit 20 calculates a first frequency of appearance of a content block with the block number i in the product detail page corresponding to the received URL (step S202). Specifically, the system control unit 20 retrieves pieces of block configuration information which are the same as that of content block correspondence information i from the first content list. Then, the system control unit 20 counts, as the first frequency of appearance, the number of the retrieved pieces of block configuration information.

Then, the system control unit 20 calculates a second frequency of appearance of a content block with the block number i in the product detail pages indentified in step 202 (step S203). Specifically, the system control unit 20 retrieves pieces of block configuration information which are the same as that of content block correspondence information i from the second content list. Then, the system control unit 20 counts, as the second frequency of appearance, the number of the retrieved pieces of block configuration information.

Then, the system control unit 20 divides the first frequency of appearance by the second frequency of appearance and thereby calculates a appearance frequency rate of the content block with the block number i (step s204).

Then, the system control unit 20 adds 1 to the block number i (step S67), and determines whether the block number i is larger than the value of the number of blocks NUM (step S68). At this time, when the block number i is the value of the number of blocks NUM or less (step S68: NO), the system control unit 20 proceeds to step S202. Then, the system control unit 20 calculates appearance frequency ratios of all the content blocks extracted in the tree search processing (step S68: YES), and then proceeds to step S205.

In step S205, the system control unit 20 compares the appearance frequency ratios of all the content blocks from the content block 1 to the content block with the block number indicated by the number of blocks NUM, and determines that a content block with the highest appearance frequency ratio is a characteristic content block. When terminating the processing, the system control unit 20 terminates the characteristic content block determination processing.

In each embodiment, text data and image data are extracted as contents constituting a Web page, but the contents to be extracted are not limited thereto. For example, a content displayed on a Web page or a content reproduced during the display of the Web page (such as animation data, voice data and electronic document) may be possible. Only predetermined types of contents may be extracted.

In each embodiment, a content between the DIV tags and a content between the TABLE tags are grouped and extracted as a content block, but a tag for grouping contents is not limited thereto.

In each embodiment, the characteristic contents of the Web page are extracted in units of content block, but each content may be extracted one by one.

In each embodiment, the characteristic content determination device according to the present invention is applied to the server device, but any characteristic content determination devices capable of acquiring HTML documents from a storage means or network can be applied to the terminal devices.

In each embodiment, the document data according to the present invention is applied to the HTML documents, but the document data may be applied to data (such as XHTML (Extensible HyperText Markup Language) document) described in a markup language and constituting a Web page.

In the above embodiments, a content constituting the product detail page in the shopping site or a content constituting the blog page in the blog service site are extracted, but the types of target site and page are not limited thereto.

DESCRIPTION OF REFERENCE NUMERALS

1: Content generation server
2: Shopping server
3: Management terminal
4: Store terminal
5: User terminal
11: Operation unit
12: Display unit
13: Communication unit
14: Drive unit
15: Storage unit
16: I/O interface unit
17: CPU
18: ROM
19: RAM
20: System control unit
21: System bus
101: Material extraction DB
201: Product detail page DB
NW: Network
S: Shopping system
6: Blog server
61: Operation unit
62: Display unit
63: Communication unit
64: Drive unit
65: Storage unit
66: I/O interface unit
67: CPU
68: ROM
69: RAM
60: System control unit
61: System bus
601: Blog page DB
602: Advertisement DB
BS: Blog system

The invention claimed is:

1. A characteristic content determination device comprising:
at least one memory operable to store program code; and
at least one processor operable to read the program code and operate as instructed by the program code, the program code including:
extraction code configured to cause the at least one processor to identify and extract content groups contained within a designated Web page of a predetermined site, wherein each of the content groups is identified via predetermined structural markup language tags and contains one or more contents included in the designated web page of the predetermined site, and wherein the predetermined site includes a plurality of Web pages;
first calculation code configured to cause the at least one processor to obtain a first frequency of appearance at which each content group of the identified content groups appears in the designated Web page;
second calculation code configured to cause the at least one processor to obtain a second frequency of appearance at which each content group of the identified content groups appears in remaining Web pages of the plurality of Web pages, excluding the designated Web page, of the predetermined site;
determination code configured to cause the at least one processor to determine a ratio of the first frequency of appearance to the second frequency of appearance with respect to each content group of the identified content groups, and determine, as a characteristic content group of the designated Web page, (i) a content group of the identified content groups with a highest determined ratio of the first frequency of appearance to the second frequency of appearance or (ii) a content group of the identified content groups with a determined ratio, meeting a threshold value of a predetermined value or more, of the first frequency of appearance to the second frequency of appearance, among the identified content groups contained within the designated Web page; and
generation code configured to cause the at least one processor to generate a new content based on the characteristic content group determined by the determination code,
wherein the generation code causes the at least one processor to generate the new content, which has a display size into which a display size of content contained within the determined characteristic content group in the designated Web page is adjusted.

2. The characteristic content determination device according to claim 1, the program code further comprises
identification code configured to cause the at least one processor to identify Web pages each including at least one content group which is the same as at least one of content groups included in the designated Web page,
wherein the second calculation code is configured to cause the at least one processor to obtain the second frequency of appearance of each content group of the identified content groups in the identified Web pages.

3. The characteristic content determination device according to claim 1,
wherein the second calculation code causes the at least one processor to obtain the second frequency of appearance of each content group of the identified content groups in multiple Web pages contained in the predetermined site.

4. The characteristic content determination device according to claim 1,
wherein the extraction code causes the at least one processor to extract each of the identified content groups according to a type of the one or more contents included in each of the identified content groups and store content information indicating the type of the one or more contents included in extracted each of the identified content groups in a storage,
the first calculation code causes the at least one processor to obtain the first frequency of appearance based on the stored content information, and
the second calculation code causes the at least one processor to obtain the second frequency of appearance based on the stored content information.

5. The characteristic content determination device according to claim 1,
wherein the generation code causes the at least one processor to generate the new content by applying a display effect on the characteristic content group.

6. The characteristic content determination device according to claim 1,
the program code further comprises insertion code configured to cause the at least one processor to insert a related content related to the characteristic content group determined by the determination code into the designated Web page.

7. The characteristic content determination device according to claim 1, wherein the predetermined structural markup language tags are in a hierarchy structure, and a tag of the predetermined structural markup language tags defining a hierarchy of a content group is identified by the tag.

8. The characteristic content determination device according to claim 7, wherein the hierarchy structure of the identified content groups are defined in a document object mode (DOM) tree.

9. The characteristic content determination device according to claim 7, wherein the first frequency of appearance and the second frequency of appearance of a first content group among the identified content groups are obtained based on morphological analysis of respective items included in the first content group.

10. A characteristic content determination method comprising:

identifying and extracting content groups contained within a designated Web page of a predetermined site, wherein each of the content groups is identified via predetermined structural markup language tags and contains one or more contents included in the designated web page of the predetermined site, and wherein the predetermined site includes a plurality of Web pages;

obtaining a first frequency of appearance at which each content group of the identified content groups appears in the designated Web page;

obtaining a second frequency of appearance at which each content group of the identified content groups appears in remaining Web pages of the plurality of Web pages, excluding the designated Web page, of the predetermined site;

determining a ratio of the first frequency of appearance to the second frequency of appearance with respect to each content group of the identified content groups, and determining, as a characteristic content group of the designated Web page, (i) a content group of the identified content groups with a highest determined ratio of the first frequency of appearance to the second frequency of appearance or (ii) a content group of the identified content groups with a determined ratio, meeting a threshold value of a predetermined value or more, of the first frequency of appearance to the second frequency of appearance, among the identified content groups contained within the designated Web page; and generating a new content based on the determined characteristic content group, wherein the generated new content has a display size into which a display size of content contained within the determined characteristic content group in the designated Web page is adjusted.

11. A non-transitory computer readable recording medium recording a computer program, which, when executed by a computer, causes the computer to perform:

identifying and extracting content groups contained within a designated Web page of a predetermined site, wherein each of the content groups is identified via predetermined structural markup language tags and contains one or more contents included in the designated web page of the predetermined site, and wherein the predetermined site includes a plurality of Web pages;

obtaining a first frequency of appearance at which each content group of the identified content groups appears in the designated Web page;

obtaining a second frequency of appearance at which each content group of the identified content groups appears in remaining Web pages of the plurality of Web pages, excluding the designated Web page, of the predetermined site;

determining a ratio of the first frequency of appearance to the second frequency of appearance with respect to each content group of the identified content groups, and determining, as a characteristic content group of the designated Web page, (i) a content group of the identified content groups with a highest determined ratio of the first frequency of appearance to the second frequency of appearance or (ii) a content group of the identified content groups with a determined ratio, meeting a threshold value of a predetermined value or more, of the first frequency of appearance to the second frequency of appearance, among the identified content groups contained within the designated Web page; and generating a new content based on the determined characteristic content group, wherein the generated new content has a display size into which a display size of content contained within the determined characteristic content group in the designated Web page is adjusted.

* * * * *